(12) United States Patent
Akiyama et al.

(10) Patent No.: US 9,255,943 B2
(45) Date of Patent: Feb. 9, 2016

(54) INFORMATION PROCESSING APPARATUS AND INFORMATION PROCESSING METHOD

(71) Applicant: Hitachi, Ltd., Tokyo (JP)

(72) Inventors: Takayuki Akiyama, Kokubunji (JP); Hideki Hayashi, Kodaira (JP); Akiko Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 520 days.

(21) Appl. No.: 13/718,279

(22) Filed: Dec. 18, 2012

(65) Prior Publication Data

US 2013/0166247 A1   Jun. 27, 2013

(30) Foreign Application Priority Data

Dec. 22, 2011   (JP) ................................ 2011-280817

(51) Int. Cl.
| | |
|---|---|
| *G01P 15/14* | (2013.01) |
| *G01C 9/14* | (2006.01) |
| *G01C 21/16* | (2006.01) |
| *G01C 21/20* | (2006.01) |

(52) U.S. Cl.
CPC ................ *G01P 15/14* (2013.01); *G01C 21/16* (2013.01); *G01C 21/206* (2013.01)

(58) Field of Classification Search
CPC ....... G01P 15/14; G01C 21/16; G01C 21/206
USPC ............ 702/94–97, 141, 142, 149, 150, 158; 701/469
See application file for complete search history.

(56) References Cited

U.S. PATENT DOCUMENTS

| | | | | |
|---|---|---|---|---|
| 5,828,987 | A | * 10/1998 | Tano et al. | .................... 702/150 |
| 2003/0208335 | A1 | * 11/2003 | Unuma et al. | ................ 702/141 |
| 2007/0067137 | A1 | 3/2007 | Ohkubo et al. | |

FOREIGN PATENT DOCUMENTS

| | | |
|---|---|---|
| JP | 2007-101526 A | 4/2007 |
| JP | 2011-237452 A | 11/2011 |

* cited by examiner

*Primary Examiner* — John H Le
(74) *Attorney, Agent, or Firm* — Foley & Lardner LLP

(57) ABSTRACT

A process of the invention analyzes a moving speed using acceleration data by an acceleration sensor and calculates a moving distance of the object. The process removes each of given candidate values of drift components from angular velocity data by a gyro sensor and generates relative azimuths data pieces. Based on the respective relative azimuths data pieces, the process calculates moving directions of the object. Using the moving distance and moving directions calculated, the process creates plural moving loci corresponding to the candidate values of drift components. By comparing the positions of actual starting and end points of moving in a building with the positions of starting and end points of each moving locus, the process evaluates the moving loci and determines an optimal moving locus out of the moving loci, based on the evaluation result.

8 Claims, 25 Drawing Sheets

FIG. 5

| BUILDING ID | ID | CATEGORY | ATTRIBUTE | FLOOR IT PERTAINS TO | NAME | COORDINATES |
|---|---|---|---|---|---|---|
| ID_B1 | ID_1 | OUTLINE | OUTLINE | 1F | FLOOR | (X1, Y1), (X2, Y2), (X3, Y3) |
| ID_B1 | ID_2 | FLOOR ACCESS POINT | ELEVATOR | 1F, 2F, 20F | FRONT ELEVATOR | (X1, Y1), |
| ID_B1 | ID_3 | FLOOR ACCESS POINT | STAIRWAY | 1F, 2F | FRONT STAIRWAY | (X1, Y1), (X2, Y2) |
| ... | ... | ... | ... | | | ... |

CORRECTING THE LOCUS TO FALL WITHIN THE BUILDING

CORRECTING THE LOCUS BY A PASSAGEWAY (LINEAR MOVE)

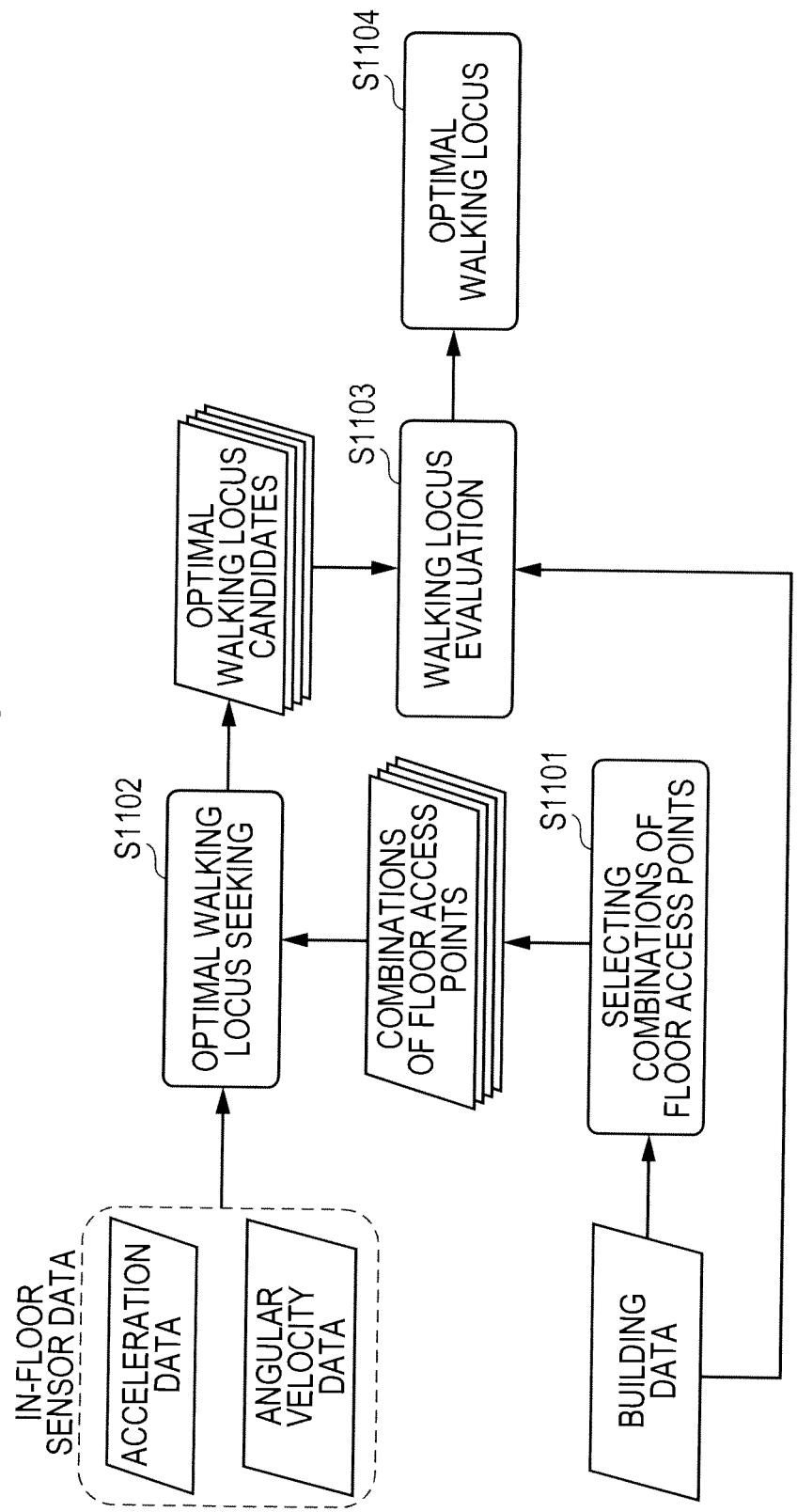

INFORMATION PROCESSING APPARATUS AND INFORMATION PROCESSING METHOD

CLAIM OF PRIORITY

The present application claims priority from Japanese patent application JP 2011-280817 filed on Dec. 22, 2011, the content of which is hereby incorporated by reference into this application.

FIELD OF THE INVENTION

The present invention relates to an information processing apparatus and an information processing method and, for example, creates information on a locus of an object moving in a building.

BACKGROUND OF THE INVENTION

A positioning method using GPS satellites, as typified by car navigation, is widely used and high precision location detection is realized. However, in indoor or shadowed places, because it is unable to receive signals from GPS satellites, location detection using GPS satellites cannot be performed. For cars, because most routes they run are outside, time during which they run through a shadowed place is short and location detection only becomes impossible transiently. On the other hand, walkers often move indoors or underground and it is difficult to continuously detect the location of a walker solely by GPS. Therefore, in indoor or underground places, it is needed to detect the location of a walker using a positioning technique other than GPS.

In this respect, for instance, as set forth in Japanese Unexamined Patent Application Publication No. 2011-237452, there is a technique that analyzes which speed and in which direction a walker is moving using data acquired by various sensors such as an acceleration sensor and a gyro sensor and infers the location of the walker. This technique makes it possible to detect the location of a walker even in a building.

SUMMARY OF THE INVENTION

However, noise (directional noise) may be included in output data of sensors (particularly a gyro sensor) and the location of a walker cannot be measured accurately. The amount of noise of a gyro sensor depends on daily weather (temperature, humidity, atmospheric pressure, etc.). Environmental conditions vary with buildings and undergrounds. Hence, various external factors causing noise cannot be identified, unless actually entering a building or underground place.

The present invention has been made in view of the above-noted circumstances and provides a technique to reduce or remove the influence of noise adaptively, even if environmental conditions which are the factors causing noise vary or change, and measure the location of a walker (moving object) more accurately.

In order to solve the above-noted problem, a process of the present invention analyzes a moving speed using acceleration data acquired by an acceleration sensor and calculates a moving distance of an object. The process removes each of a plurality of given candidate values of drift components from angular velocity data acquired by a gyro sensor and generates a plurality of relative azimuths data pieces. Based on the respective relative azimuths data pieces generated, the process calculates a plurality of moving directions of the object. Then, using information on the moving distance and moving directions calculated, the process creates a plurality of moving loci corresponding to the plurality of candidate values of drift components. In turn, by comparing the positions of actual starting and end points of moving in a building with the positions of starting and end points of each of the moving loci, the process evaluates the moving loci and determines an optimal moving locus out of the moving loci, based on the evaluation result.

Further features related to the present invention will be apparent from the description of the present specification and the accompanying drawings. Aspects of the present invention are achieved and realized by elements and various combinations of elements, the following detailed description, and the aspects of the attached claims.

The description of the present specification is only typical and illustrative and is not intended to limit the claims or application examples in any sense.

According to the present invention, it becomes possible to reduce or remove sensor noise adaptively to various environmental conditions in a building and create a moving locus of a moving body more accurately.

BRIEF DESCRIPTION OF THE DRAWINGS

FIG. 5 is a diagram showing an example of a structure of building data;

FIG. 11 is a flowchart for explaining a walking locus inference process in the sixth embodiment;

DETAILED DESCRIPTION OF THE PREFERRED EMBODIMENTS

Figure 1:
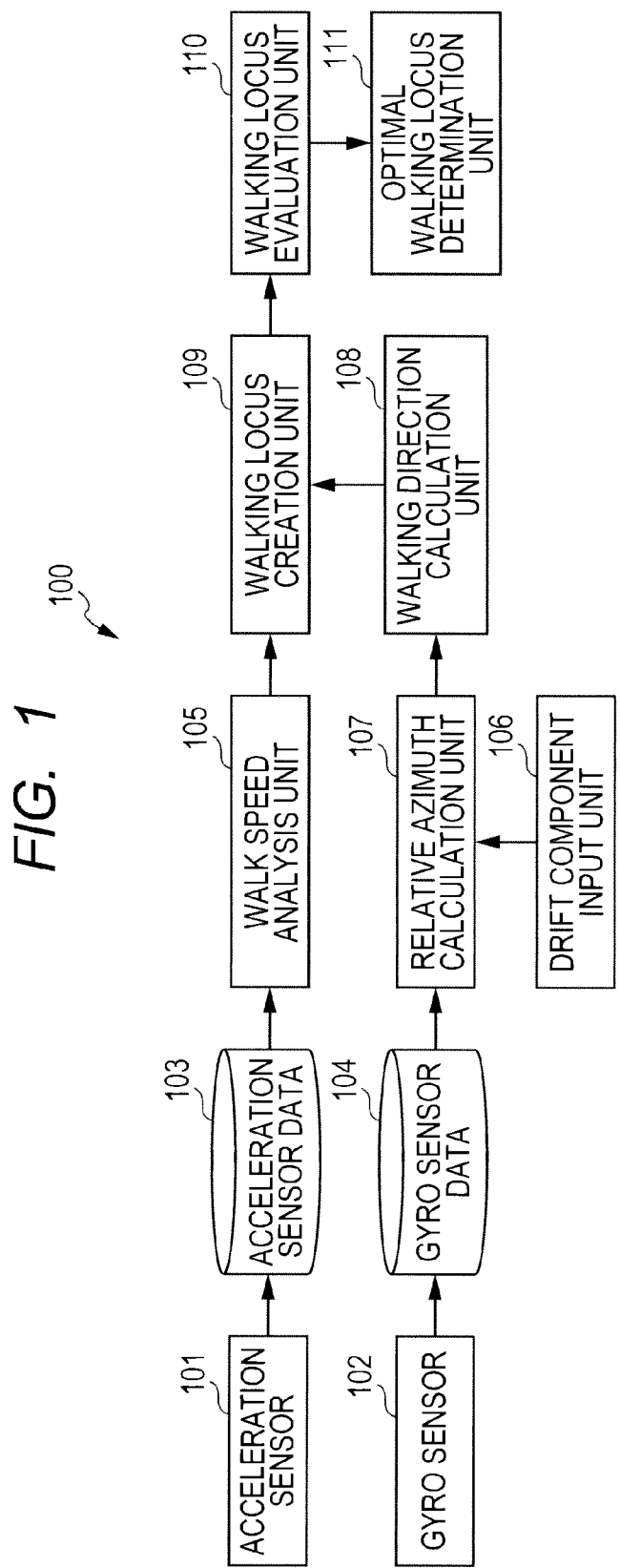
FIG. 1 is a diagram showing an example of a schematic structure of an information processing apparatus (walking locus inference apparatus) according to a first embodiment of the present invention.

In the following, embodiments of the present invention will be described with reference to the accompanying drawings. In the accompanying drawings, functionally identical elements may be marked with same reference numerals. The accompanying drawings show specific embodiments and examples according to the principle of the present invention. These drawings are intended for understanding of the present invention and they are by no means used to interpret the present invention restrictively.

Embodiments disclosed herein are described in detail enough for those skilled in the art to carry out the present invention. However, other implementations and embodiments are also possible. It needs to be understood that a structure or configuration described herein may be modified and diverse elements may be rearranged without departing from the scope and spirit of the technical idea of the invention. Therefore, the following descriptions should not be construed as limiting thereto.

Moreover, the embodiments of the present invention may be implemented by software running on a general-purpose computer or may be implemented by dedicated hardware or combinations of software and hardware.

In the following embodiments, various processing units take charge of their processing tasks, thereby creating and outputting final data. However, a processor (one control unit) may execute the functions of the respective processing units according to various programs.

(1) First Embodiment

In a first embodiment, it is presumed that a time instant when a walker entered a coverage floor and a time instant when the walker exited the floor are known and the coordinates of a starting point (an entrance of the coverage floor such as a door, stairway, and elevator) and an end point (an exit of the coverage floor such as a door, stairway, and elevator) are known or given by a user. In the first embodiment, values assigned to a plurality of drift components are prepared in advance. By varying the values of these drift components, a process creates a plurality of walking loci (which are of the same distance, but have different forms, because an absolute orientation is not defined in the first embodiment). The thus created walking loci are evaluated using the coordinate values of their starting point and end point. Based on the evaluation, an optimal walking locus is determined.

<Structure of Information Processing Apparatus>

FIG. 1 is a diagram showing an example of a schematic structure of an information processing apparatus (also referred to as a walking locus inference apparatus) 100 according to the first embodiment of the present invention. The information processing apparatus 100 includes an acceleration sensor 101 that takes a real time measurement of acceleration changing as a walker moves, a gyro sensor 102 that takes a real time measurement of angular velocity changing as a walker moves, an acceleration sensor data storage unit (memory or storage device) 103 that stores sequentially measured acceleration data of a walker (gravity g and move acceleration m/s$^2$ or only gravity g when speed remains unchanged), a gyro sensor data storage unit (memory or storage device) 104 that stores sequentially measured angular velocity data (degrees/s) of a walker, a walk speed analysis unit 105 that calculates a walk speed based on the acceleration sensor data (acceleration data), a drift component input unit 106 for inputting a plurality of values as noises (drift components) included in the gyro sensor data, a relative azimuth calculation unit 107 that calculates a relative azimuth from previous measurement data using the angular velocity, taking account of the drift components, a walking direction calculation unit 108 that calculates a direction toward which a walker is moving by using the obtained relative azimuth, a walking locus creation unit 109 that creates (infers) information representing walking loci in a building which correspond to a plurality of entered drift components respectively, based on the obtained walk speed information and walking direction information, a walking locus evaluation unit 110 that evaluates a plurality of walking loci created by the walking locus creation unit 109, and an optimal walking locus determination unit 111 that determines an optimal walking locus based on the evaluation by the walking locus evaluation unit 110. Although, in FIG. 1, the acceleration sensor data storage unit 103 and gyro sensor data storage unit 104 are provided respectively as separate storage units, each sensor data piece may be stored in a single storage unit (memory or storage device). Each sensor data piece is appended with a time stamp corresponding to measurement time information.

The walk speed analysis unit 105 reads acceleration sensor data, that is, acceleration data of a walker at each time point (the acceleration data is temporally consecutive data if acceleration is measured continuously or data at each measurement time point if acceleration is measured discretely) from the acceleration sensor data storage unit 104 and analyzes what rate of speed at which the walker has so far moved and a walk distance of the walker (which is calculated by multiplying the analyzed speed by the time it took to move at that speed). A method for analyzing a speed and a walk distance using acceleration data is well known; for example, there is a method disclosed in Japanese Unexamined Patent Application Publication No. 2007-101526. Because any method may be used to derive walk speed and walk distance information from the walker's acceleration information, a description of a specific method for doing so is here dispensed with.

The drift component input unit 106 is provided to input candidate values of drift components which are prepared in advance. The candidate values of drift components assume, for example, values that change in steps of one degree from an angular velocity of 1 degree/s to 360 degrees/s (the width of a step is 1 degree/s). Although the values of drift components from 1 degree/s to 360 degrees/s are prepared as defaults, it may be expedient to define an optimal range of values, while deleting drift values determined to be impossible to have in the course of using the information processing apparatus 100.

The relative azimuth calculation unit 107 takes gyro sensor data (angular velocity data) from the gyro sensor data storage unit 104 and drift components (noise components) from the drift component input unit 106. Then, the relative azimuth calculation unit 107 obtains relative azimuth information in which noise is removed by subtracting each of the drift components from the angular velocity data it has taken. Because a plurality of values of drift components are provided from the drift component input unit 106, the relative azimuth calculation unit 107 is to calculate relative azimuths which correspond to the drift components respectively and preserve them in a memory or the like which is not shown.

The walking direction calculation unit 108 takes a plurality of relative azimuth information pieces in which noise is removed from the relative azimuth calculation unit 107. Because relative azimuth information is information relevant to a relative direction between the respective measuring time points, an absolute orientation cannot be known from this information. Therefore, for each of the relative azimuth information pieces, the walking direction calculation unit 108 integrates relative azimuths at each measurement time point, thereby calculating walking directions (the forms of walking loci), and preserves them in the memory or the like not shown.

The walking locus creation unit 109 takes walk speed information and walk distance information at each time point from the walk speed analysis unit 105 and information for a plurality of walking directions from the walking direction calculation unit 108. Then, the walking locus creation unit 109 obtains walking loci with respect to the respective walking directions and preserves them in the memory or the like not shown. Here, because the walk distance is the same, the loci having different forms and of the same walk distance are to be obtained.

To evaluate a plurality of walking loci obtained by the walking locus creation unit 109, the walking locus evaluation unit 110 compares the coordinates of the starting and endpoints of each walking locus with the coordinates of actual starting and end points. That is, the starting point of each walking locus is adjusted to the coordinates of an actual starting point and the walking locus is rotated around the starting point so that the coordinates of its end point will be positioned nearest to the coordinates of an actual end point. Then, the walking locus evaluation unit 110 calculates a distance between the end point of each walking locus and the actual end point and outputs it as an evaluation value. The calculated distance may be directly taken as an evaluation value or a shorter distance may give a higher evaluation value. A user may enter information representing an absolute orientation; in this case, it is not necessary to rotate obtained walking loci.

The optimal walking locus determination unit 111 takes evaluation values and their corresponding walking loci information from the walking locus evaluation unit 110 and determines a walking locus having the best evaluation value (the distance between its end point and the actual end point is shortest) as an optimal walking locus.

Walking loci are obtained in this way for the reason as below. For instance, communications carriers want to grasp how the radio field strength for a wireless LAN or the like is distributed in a building. For this purpose, a measurer has to enter the building of interest and measure radio field strength closely. To do this, however, is very costly. So a suggestion is to have a person who routinely moves in the building (for example, a checker of the building or facilities inside the building) carry the information processing apparatus 100 and check the walking loci of the person in the building with radio field strength data acquired in places during the movement of the person (details thereof will be described later). This makes it possible to provide information on radio field strength inside the building and to drastically reduce the cost required for acquiring radio field strength information. For such a reason, there is a need for obtaining walking loci.

<Process Flow>

Figure 2:
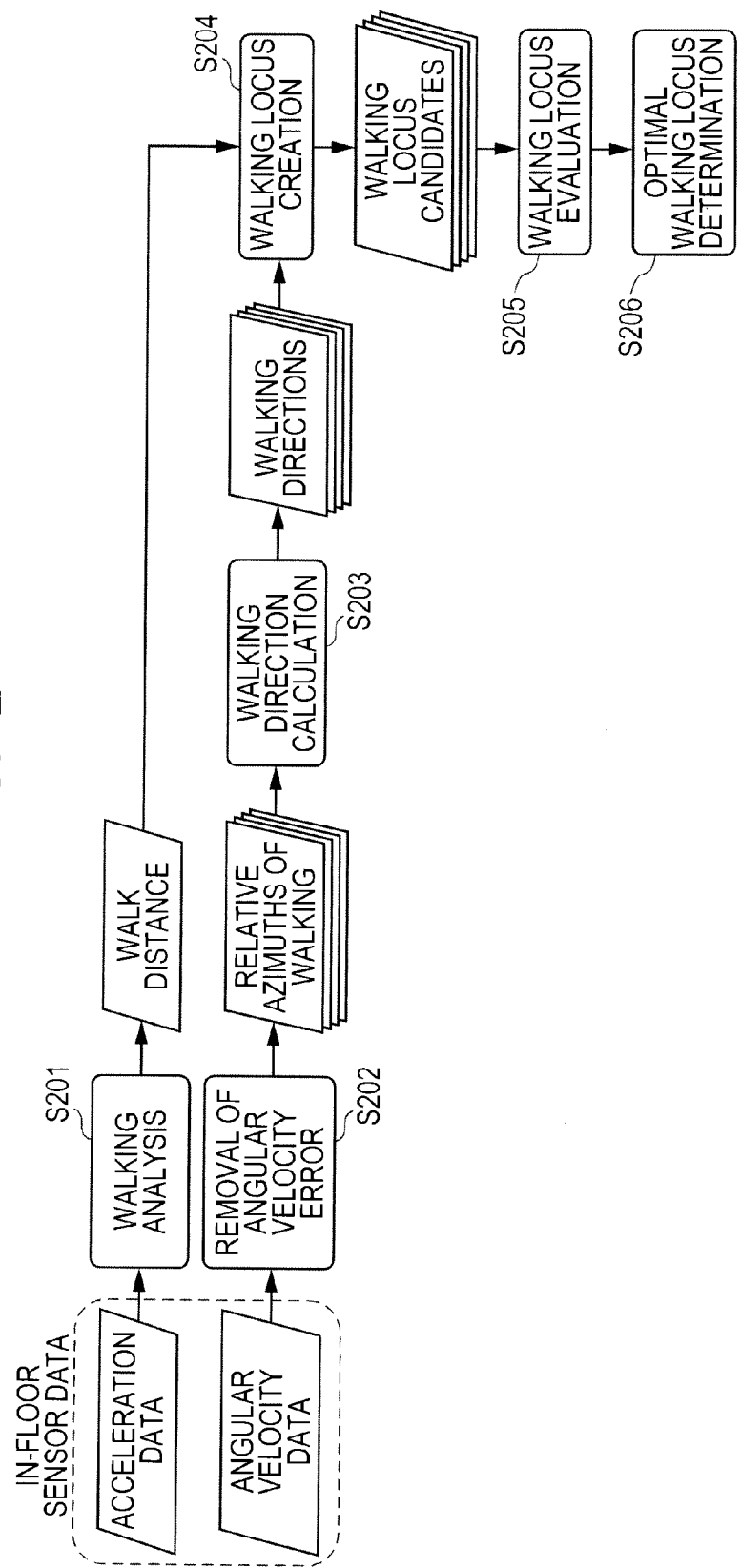
FIG. 2 is a flowchart for explaining a walking locus inference process in the first embodiment.

FIG. 2 is a flowchart for explaining a process flow up to optimal walking locus determination in the information processing apparatus 100.

The walk speed analysis unit 105 analyzes acceleration data of a walker, calculates a walk speed and a walk distance (S201), and preserves them in a memory (which is not shown in FIG. 1).

For a plurality of drift (noise) components entered, the relative azimuth calculation unit 107 removes an angular velocity error by subtracting each drift component from angular velocity data at each time point, calculates information representing relative azimuths of walking, and preserves them in the memory not shown (S202).

The walking direction calculation unit 108 takes information for a plurality of relative azimuths of walking from the memory, integrates the respective relative azimuths, calculates walking directions (the forms of walking loci) corresponding to the respective drift components, and preserves them in the memory not shown (S203).

The walking locus creation unit 109 reads walk distance information and information for a plurality of walking directions from the memory, creates a plurality of walking loci corresponding to the respective drift components, and preserves them as walking locus candidates in the memory not shown (S204). The walking loci obtained here have different forms from one another and an absolute orientation thereof is not defined.

Also, the walking locus creation unit 109 adjusts the starting point of each walking locus created to the coordinates of an actual starting point and rotates the walking locus around the starting point so that the coordinates of its end point will be positioned nearest to the coordinates of an actual end point.

Then, the walking locus evaluation unit 110 calculates a distance of the end point of each walking locus and the actual end point and outputs it as an evaluation value (S205).

The optimal walking locus determination unit 111 determines a walking locus having the best evaluation value (the smallest difference between its end point and the actual end point) as an optimal one (S206).

(2) Second Embodiment

In a second embodiment, calculating walking directions is executed taking account of orientation data, in addition to the structure and process of the first embodiment.

Figure 3:
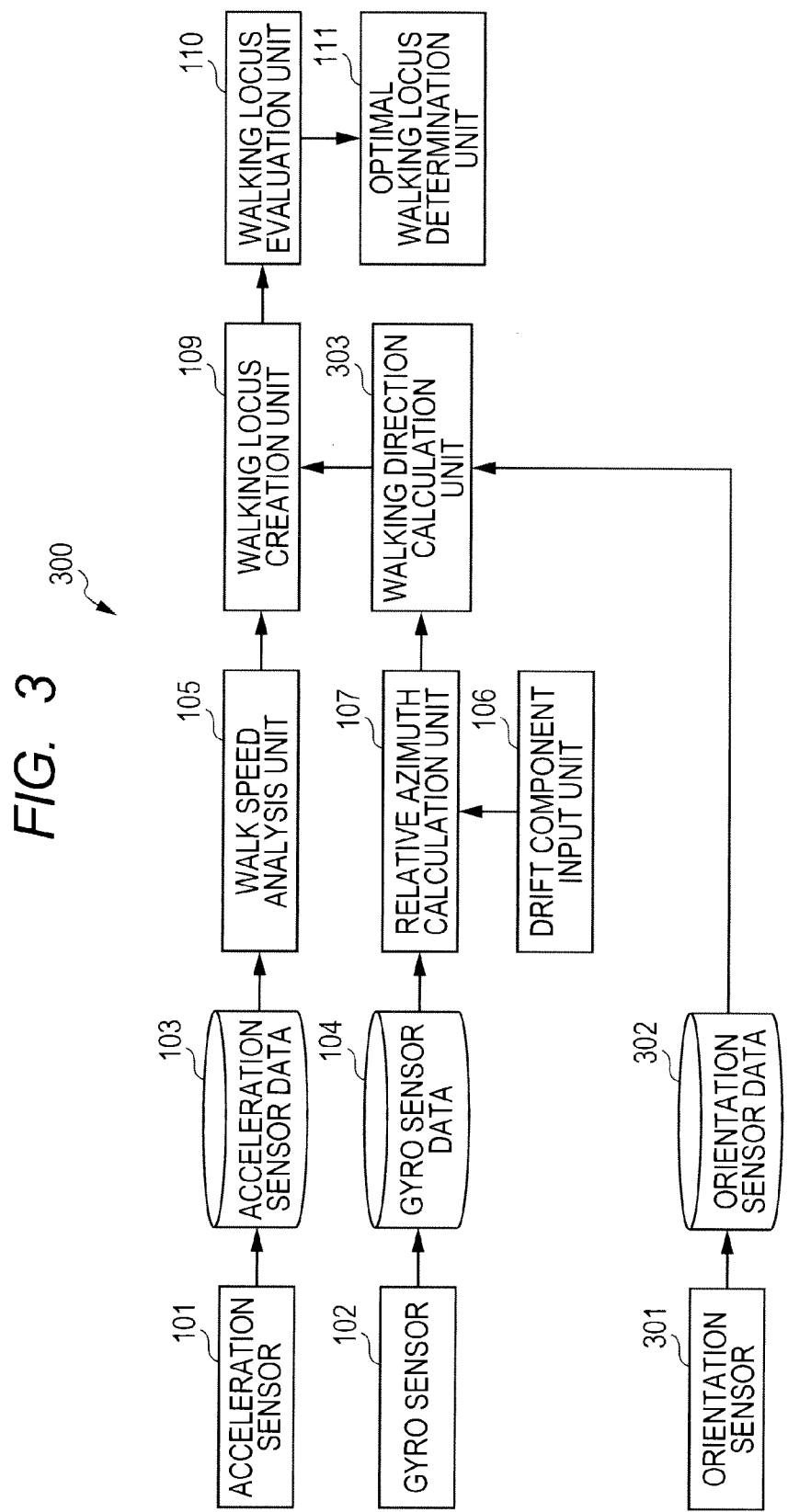
FIG. 3 is a diagram showing an example of a schematic structure of an information processing apparatus (walking locus inference apparatus) according to a second embodiment of the present invention.

FIG. 3 is a diagram showing an example of a schematic structure of an information processing apparatus (also referred to as a walking locus inference apparatus) 300 according to the second embodiment. Like the information processing apparatus 100, the information processing apparatus 300 includes an acceleration sensor 101, a gyro sensor 102, an acceleration sensor data storage unit (memory) 103, a gyro sensor data storage unit (memory) 104, a walk speed analysis unit 105, a drift component input unit 106, a relative azimuth calculation unit 107, a walking direction calculation unit 303, a walking locus creation unit 109, a walking locus evaluation unit 110, and an optimal walking locus determination unit 111 and, besides, includes an orientation sensor (compass) 301 and an orientation sensor data storage unit 302.

Because orientation data is additionally used in calculating a walking direction, the walking direction calculation unit 303 takes orientation data indicating an absolute orientation and a plurality of relative azimuth information pieces calculated by the relative azimuth calculation unit 107, calculates the forms of walking loci respectively on the basis of the orientation data, and preserves them as information for a plurality of walking directions in the memory not shown.

Since absolute orientation information is given in the second embodiment, the walking locus evaluation unit 110 only adjusts the starting point of each walking locus created by the walking locus creation unit 109 to an actual starting point, but does not execute rotating the walking locus to position its end point nearest to an actual end point.

(3) Third Embodiment

In a third embodiment, walking loci are adjusted and evaluated using building data (including information on a building outline and floor access points such as stairways and elevators.

<Structure of Information Processing Apparatus>

Figure 4:
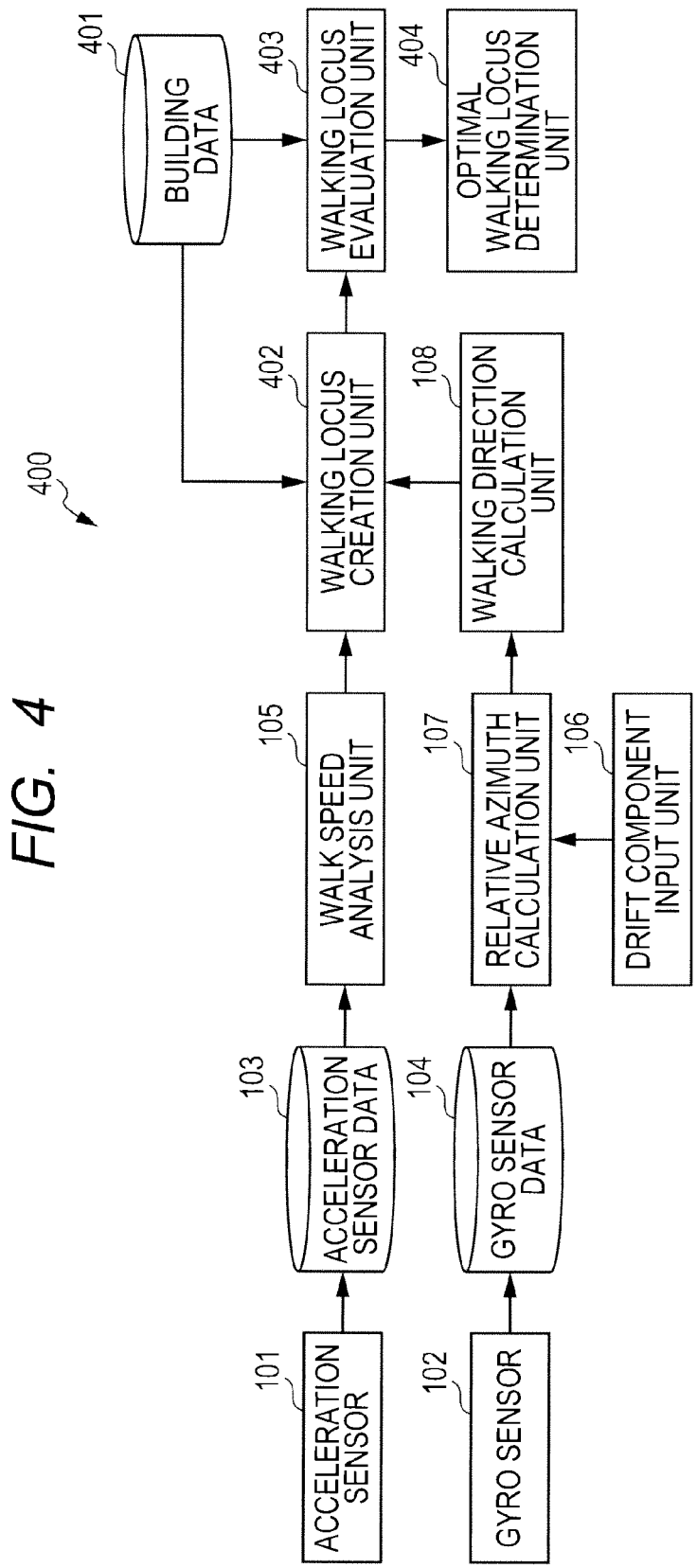
FIG. 4 is a diagram showing an example of a schematic structure of an information processing apparatus (walking locus inference apparatus) according to a third embodiment of the present invention.

FIG. 4 is a diagram showing an example of a schematic structure of an information processing apparatus (walking locus inference apparatus) 400 according to the third embodiment. The information processing apparatus 400 includes a building data storage unit 401 in addition to the structure of the information processing apparatus 100. Because processing is performed using building data, the operations of a walking locus creation unit 402, a walking locus evaluation unit 403, and an optimal walking locus determination unit 404 differ from those in the first embodiment.

The building data storage unit 401 stores information on the outline of at least one building, floor access points (stairways, elevators, etc.) inside the building, and its internal structure (in-building map information), etc.

As previously described, the walking locus creation unit 402 creates a plurality of walking loci corresponding to respective drift components, based on the walk distance obtained by the walk speed analysis 105 and information for walking directions obtained by the walking direction calculation unit 108. Also, the walking locus creation unit 402 reads building data of interest from the building data storage unit 401 and rotates each walking locus around its starting point and scales down or up it so that the starting and end points of the walking locus will coincide with the coordinates of actual starting and endpoints in the building. Because such adjustment is made to each walking locus, a walking locus of a walk distance that differs from the distance obtained by the walk speed analysis unit 105 may sometimes be created. However, this adjustment processing by rotating and scaling up or down the locus is performed for a case when the coordinates of starting and end points differ. Different processing as will be described later is performed for a case when the coordinates of starting and end points are the same. Thus, walking locus evaluation also differs between the case when the starting and end points differ and the case when they are the same. Descriptions with regard to FIG. 4 are provided for only the case when the starting and end points differ.

The walking locus evaluation unit 403 reads building data (outline information) of interest from the building data storage unit 401, judges each of the adjusted walking loci obtained by the walking locus creation unit 402 whether it falls within the building, and outputs the judgment result and the walk distance of each locus as an evaluation result.

The optimal walking locus determination unit 404 takes the evaluation result from the walking locus evaluation unit 403, extracts a walking locus falling within the building, and determines it as an optimal walking locus. If there are plural walking loci falling within the building, the optimal walking locus determination unit 404 determines a walking locus of the longest walk distance as optimal. This is because, considering a situation where a walker (e.g., a checker of facilities or the like) moves around inside a building, it is conceivable that the walker may move through various paths and, accordingly, the walk distance is more likely to become longer.

<Example of Building Data>

FIG. 5 is a diagram showing an example of a structure of building data 500. The building data 500 has constituent items below: building ID 501, ID 502, category 503, attribute 504, floor it pertains to 505, name 506, and coordinates 507.

The building ID 501 is identification information for uniquely specifying or identifying a building.

The ID 502 is identification information for uniquely specifying or identifying an object of management. For example, IDs are serially assigned to all objects.

The category 503 is information for specifying the category of an object which is, for example, building outline, floor access point, passage, room, etc.

The attribute 504 is information for specifying the attribute of an object which is, for example, outline, elevator, passageway, conference room, etc.

The floor it pertains to 505 is information for specifying a floor to which the object specified by category 503 and attribute 504 pertains.

The name 506 is information representing the name of the object specified by category 503 and attribute 504.

The coordinates 507 is information for specifying the position of the object specified by category 503 and attribute 504 within the floor it pertains to 505. For example, four coordinate points are given to a building outline, one coordinate point is given to an elevator, and two coordinate points are given to a stairway because it has a depth.

Because an access point is a position of entrance to or exit from a floor to which an object pertains, it is regarded as an actual starting or end point as mentioned above. Thus, a user may specify any access point as a starting point and an end point, though the coordinates of starting and end points are not given in the present embodiment.

Although description has been made about building data in a "table" here, building data may not necessarily be expressed in such a table data structure. Building data may be expressed in a data structure such as a list, DB, and queue and others. To imply that building data does not depend on data structure, "table", "list", "DB", "queue", etc. may also be referred to as "information" and "data" simply.

In describing each information piece, terms "identification information", "identifier", "designation", "name", and "ID" can be used; these terms are replaceable by one another.

<Process Flow>

Figure 6:
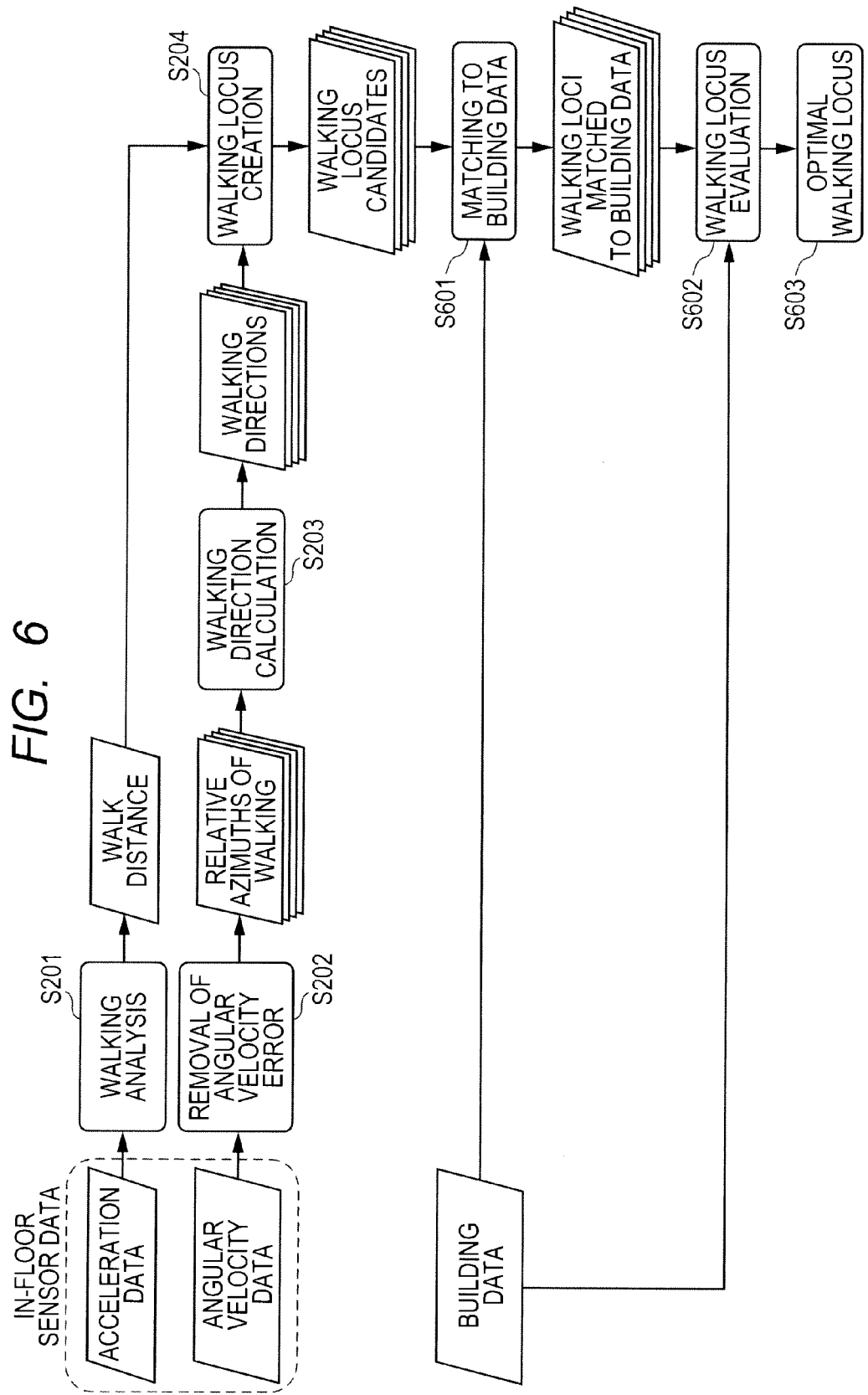
FIG. 6 is a flowchart for explaining a walking locus inference process in the third embodiment.

FIG. 6 is a flowchart for explaining a process flow up to optimal walking locus determination in the information processing apparatus 400. In FIG. 6, steps in which the same processing as in FIG. 2 is performed are assigned the same reference numerals.

The walk speed analysis unit 105 analyzes acceleration data of a walker, calculates a walk speed and a walk distance (S201), and preserves them in a memory (not shown).

For a plurality of drift (noise) components entered, the relative azimuth calculation unit 107 removes an angular velocity error by subtracting each drift component from angular velocity data at each time point, calculates information representing relative azimuths of walking, and preserves them in the memory not shown (S202).

The walking direction calculation unit 108 takes information for a plurality of relative azimuths of walking from the memory, integrates the respective relative azimuths, calculates walking directions (the forms of walking loci) corresponding to the respective drift components, and preserves them in the memory not shown (S203).

The walking locus creation unit 402 reads walk distance information and information for a plurality of walking directions from the memory and creates a plurality of walking loci corresponding to the respective drift components (S204). The walking loci obtained here have different forms from one another and an absolute orientation thereof is not defined.

Then, the walking locus creation unit 402 reads building data of interest from the building data storage unit 401 and performs matching (an adjustment) to building data for each walking locus created (S601). Specifically, if starting and end points actually differ (if a position of entrance to the floor differs from a position of exit from the floor), the walking locus creation unit 402 adjusts the starting point of each walking locus to an actual starting point and rotates and scales up or down the walking locus so that the starting and end points of the walking locus will coincide with the coordinates of actual starting and end points (which are the coordinates of different floor access points), thus creating an adjusted walking locus. On the other hand, if starting and endpoints are actually the same (if a position of entrance to the floor is the same as a position of exit from the floor), the walking locus creation unit 402 adjusts the starting point of each walking locus to an actual starting point, rotates the walking locus, and determines only a direction of the locus. By fixing the position of the end point of the walking locus, it creates an adjusted walking locus. It does not perform scaling up or down in the case when the starting and end points are the same. A plurality of walking loci adjusted as above are preserved in the memory not shown.

The walking locus evaluation unit 403 reads building data of interest from the building data storage unit 401 and walking loci matched (adjusted) to building data from the memory not shown and evaluates each walking locus (S602). Specifically, if the starting and end points differ, the walking locus evaluation unit 403 judges each of the walking loci matched (adjusted) to building data (the loci whose starting and end points coincide with the actual starting and end points) whether it falls within the building data (outline) and outputs the judgment result and the walk distance of each walking locus as an evaluation result. On the other hand, if the starting and end points are the same, the walking locus evaluation unit 403 calculates, for each of the walking loci matched to building data (the loci whose walking orientation is determined to fall within the building), a difference (distance) between the starting and end points of the walking locus and an in-building ratio by which the walking locus falls within the building (floor outline) and outputs the difference and the in-building ratio as an evaluation result.

The optimal walking locus determination unit 404 determines a walking locus having the best evaluation result as optimal one (S603). Specifically, if the starting and end points differ, the optimal walking locus determination unit 404 determines a walking locus falling within the building (outline) as an optimal one. Here, if there are a plurality of walking loci falling within the building, it selects a walking locus of the largest walk distance. On the other hand, if the starting and end points are the same, the optimal walking locus determination unit 404 determines a walking locus having the smallest difference between the starting and end points as an optimal one. Here, if there are a plurality of walking loci having the same difference, it selects a walking locus having the largest in-building ratio.

(4) Fourth Embodiment

A fourth embodiment calculates walking directions with the addition of absolute orientation information along with the third embodiment. Other operations and processing steps are the same as the third embodiment.

<Structure of Information Processing Apparatus>

Figure 7:
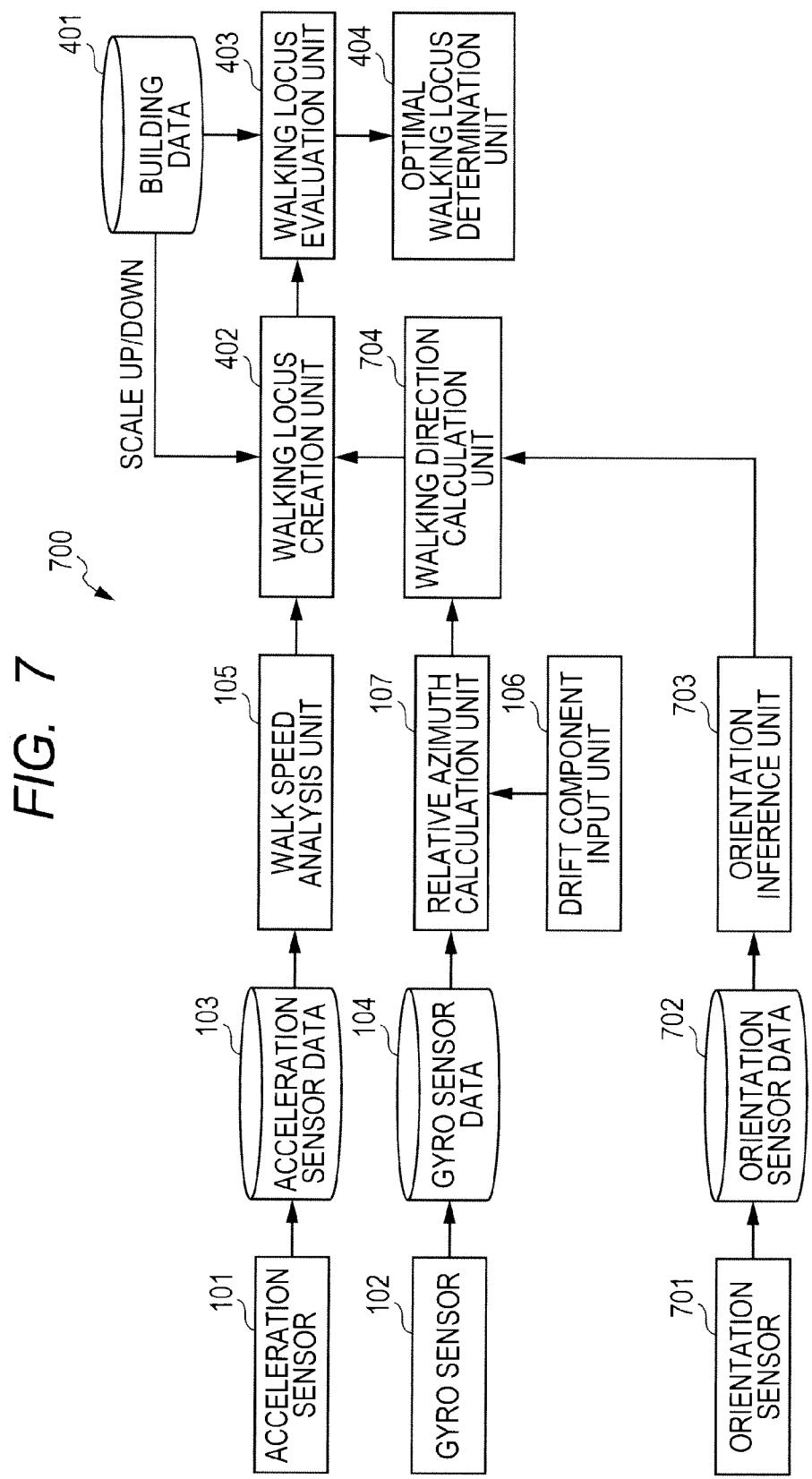
FIG. 7 is a diagram showing an example of a schematic structure of an information processing apparatus (walking locus inference apparatus) according to a fourth embodiment of the present invention.

FIG. 7 is a diagram showing a schematic structure of an information processing apparatus (walking locus inference apparatus) 700 according to the fourth embodiment of the present invention. In addition to the structure of the information processing apparatus 400, the information processing apparatus 700 further includes an orientation sensor (compass) 701 that takes a real time measurement of a moving orientation of a walker, an orientation sensor data storage unit (memory or storage device) 702 for storing orientation sensor data, and an orientation inference unit 703 that infers an absolute orientation of a walker. Because of using absolute orientation data, the walking direction calculation unit 704 performs different processing from in the third embodiment.

The orientation inference unit 703 extracts a period of time during which orientation data stably indicates a constant direction from an orientation sensor data set of a walker who is the object of locus inference processing and infers that direction data as an absolute orientation.

The walking direction calculation unit 704 reads data pieces for a plurality of relative azimuths corresponding to respective drift components from the relative azimuth calculation unit 107 and absolute orientation data from the orientation inference unit 703. Then, the walking direction calculation unit 704 calculates walking directions of a walker by executing an integral operation on respective relative azimuth data pieces on the basis of the absolute orientation.

(5) Fifth Embodiment

Along with the third embodiment, a fifth embodiment performs correction processing for a walking locus determined as optimal, but not falling within a building (outline), so that the locus will fall within the building.

<Structure of Information Processing Apparatus>

Figure 8:
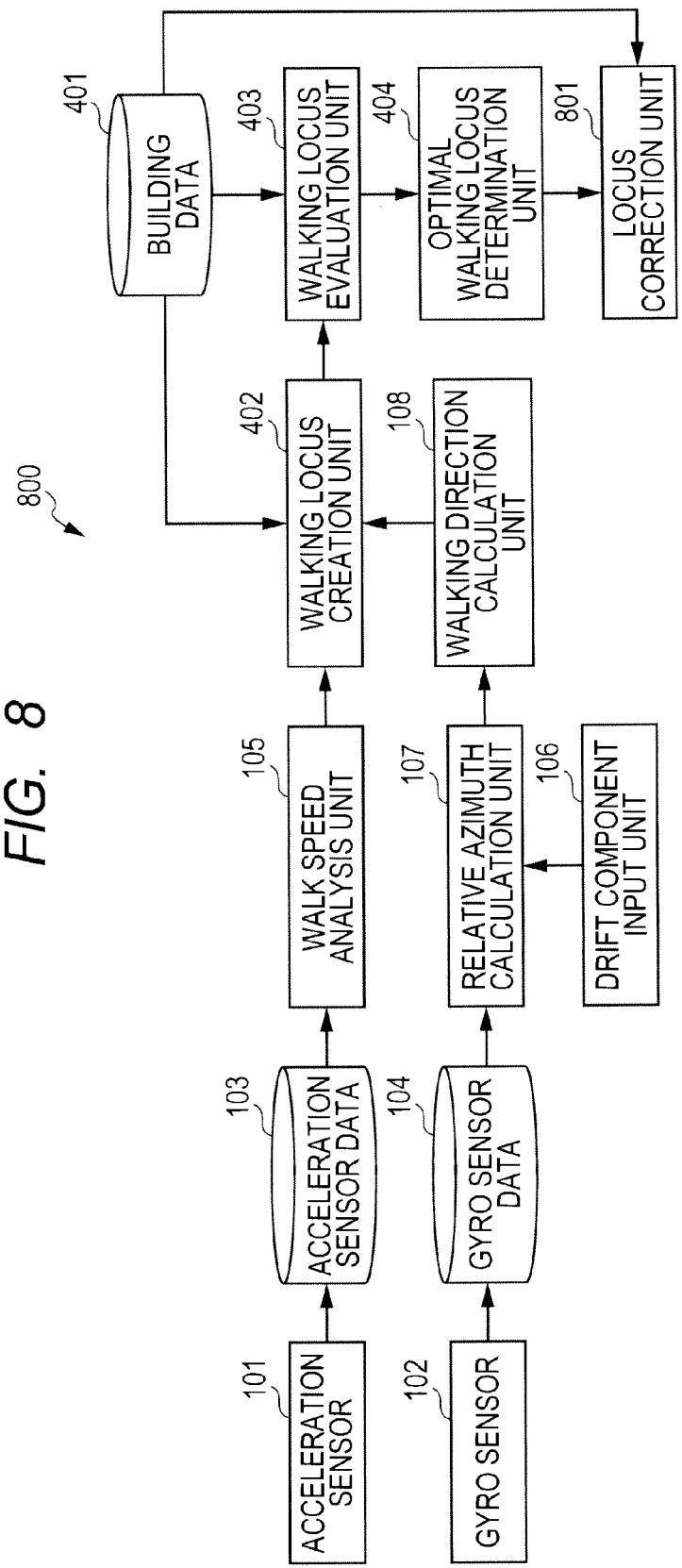
FIG. 8 is a diagram showing an example of a schematic structure of an information processing apparatus (walking locus inference apparatus) according to a fifth embodiment of the present invention.

FIG. 8 is a diagram showing a schematic structure of an information processing apparatus 800 according to the fifth embodiment of the present invention. In addition to the structure of the information processing apparatus 400, the information processing apparatus 800 further includes a locus correction unit 801 that performs correction processing for a walking locus determined as optimal by the optimal walking locus determination unit 404. The locus correction unit 801 may be provided in the structure of the fourth embodiment.

As previously described (for the third embodiment), if the coordinates of actual starting and end points differ, the optimal walking locus determination unit 404 does not select a walking locus not falling within the building outline. Thus, the locus correction unit 801 is triggered to operate in the case when the coordinates of actual starting and end points are the same and if a walking locus determined as optimal (having the smallest difference between the starting and end points of the locus) does not fall within the building outline. Concrete processing details of the locus correction unit 801 are now described with reference to FIG. 9.

<Concrete Examples of Locus Correction Processing>

Figure 9A:
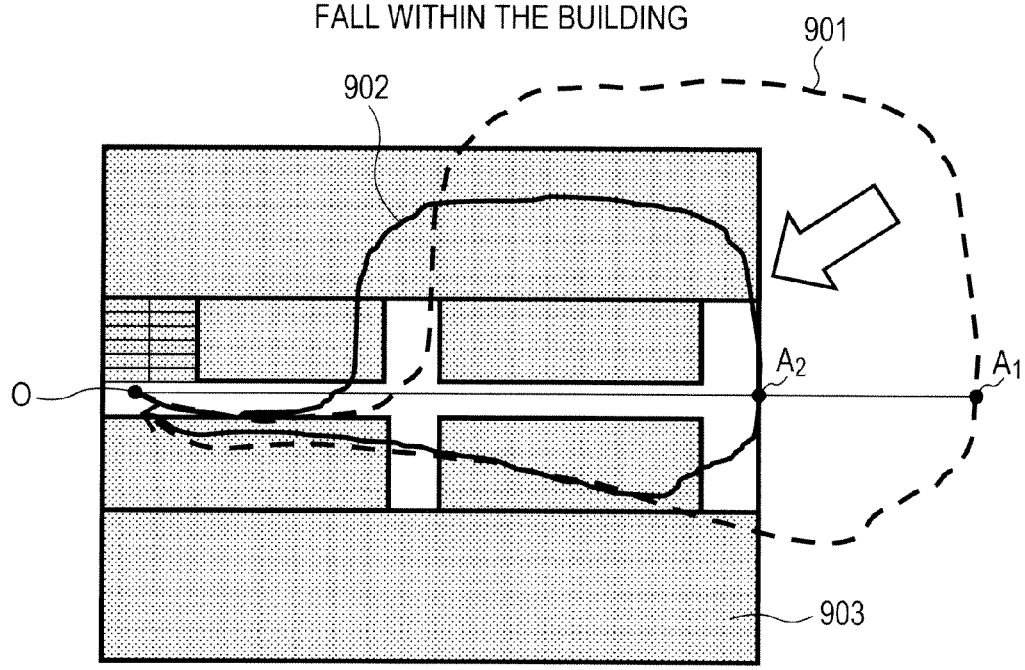
FIGS. 9A and 9B are diagrams for explaining concrete examples of locus correction processing by a locus correction unit in the fifth embodiment.
Figure 9B:
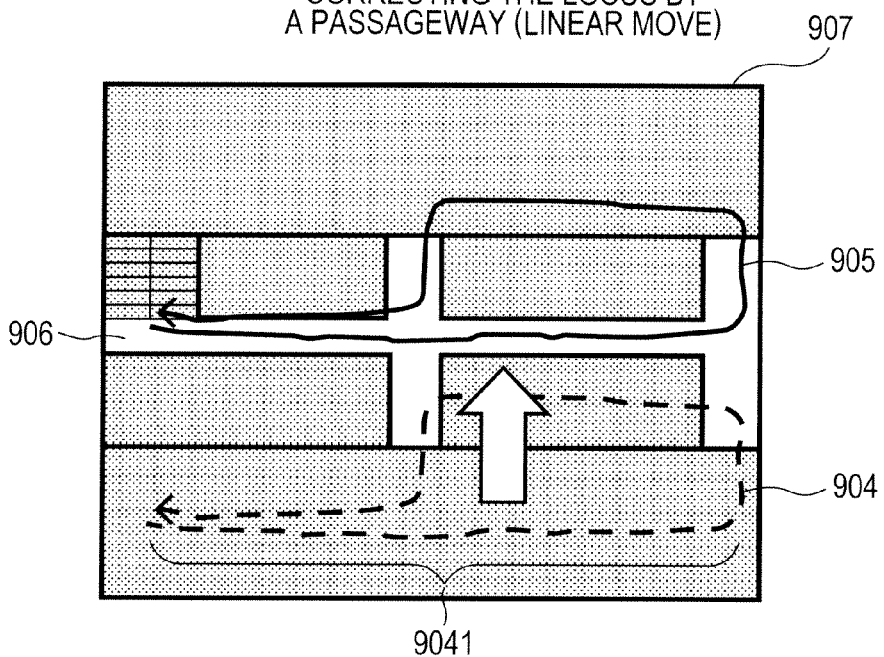

FIGS. 9A and 9B are diagrams for explaining concrete example of walking locus correction processing. FIG. 9A illustrates correcting a walking locus that is of improper size and extends outside the building (correcting the locus to fall within the building). FIG. 9B illustrates correcting a walking locus whose size is no problem, but being out of position in the building (correcting the locus by a passageway (linear move).

(i) Correcting the locus to fall within the building (FIG. 9A)

As shown in FIG. 9A, suppose that a walking locus obtained by the optimal walking locus determination unit 404 is mapped as drawn by a dashed line 901 on an in-building map. In this case, the form of the walking locus drawn by the dashed line 901 is inferred properly, but its size is not inferred correctly. The reason why the size is not inferred correctly like this is because an erroneous walk speed analyzed by the walk speed analysis unit 105 makes the move distance of the walker evenly longer (in another example, an erroneous walk speed may make the move distance shorter).

Concrete correction processing is as follows. Given that A1 denotes a point on the dashed line 901 being at the longest distance from an origin 0 (e.g., the coordinates of an entrance to the building are assumed as the origin) and A2 denotes an intersection point between a line from 0 to A1 and the outline of building data 903, a ratio between (length from the origin 0 to the point A1) and (length from the origin 0 to the point A2), i.e., (0–A2/0–A1) is calculated. By multiplying all points on the walking locus (dashed line 901) by this ratio, the walking locus is scaled down to a corrected locus 902. In this way, the walking locus extending out of the building can be made to fall within the building.

(ii) Correcting the Locus by a Passageway (Linear Move) (FIG. 9B)

As shown in FIG. 9B, suppose that a walking locus obtained by the optimal walking locus determination unit 404 is mapped as drawn by a dashed line 904 on the in-building map. In this case, the form of the walking locus drawn by the dashed line 904 is inferred properly, but the reference position of the locus is erroneous.

The walking locus drawn by the dashed line 904 includes a linear portion 9041 as a characteristic portion. On the other hand, the building data includes a linear passage (passageway) 906 as a characteristic portion. The passage existing within the building data is defined by an object (representing the passage) of the building data.

Thus, because the characteristic portion (linear portion) 9041 of the locus corresponds to the characteristic portion (passage) of the building data, by aligning the linear portion 9041 with the passage 906, a properly inferred waking locus will be obtained. In this case, by simply translating the walking locus drawn by the dashed line 904 and aligning the linear portion 9041 with the passage 906, a corrected locus 905 can be obtained.

Although scaling down (FIG. 9A) and vertical translation (FIG. 9B) are only shown in FIGS. 9A and 9B, it is possible to make a correction by arbitrary combination, such as correction by combination of scaling down or up and translation, correction by vertical and horizontal translations, or correction by rotation at a given angle.

(6) Sixth Embodiment

In the foregoing embodiments, it is presumed that the coordinates of actual starting and end points are known beforehand or given by a user. However, the coordinates of starting and end points are not always known. For example, if there are a plurality of access points (stairways and elevators) within one floor, it is hard to set which access point as the coordinates of appropriate starting and end points, unless specified by a user.

A sixth embodiment provides processing to cope with such a situation.

<Structure of Information Processing Apparatus>

Figure 10:
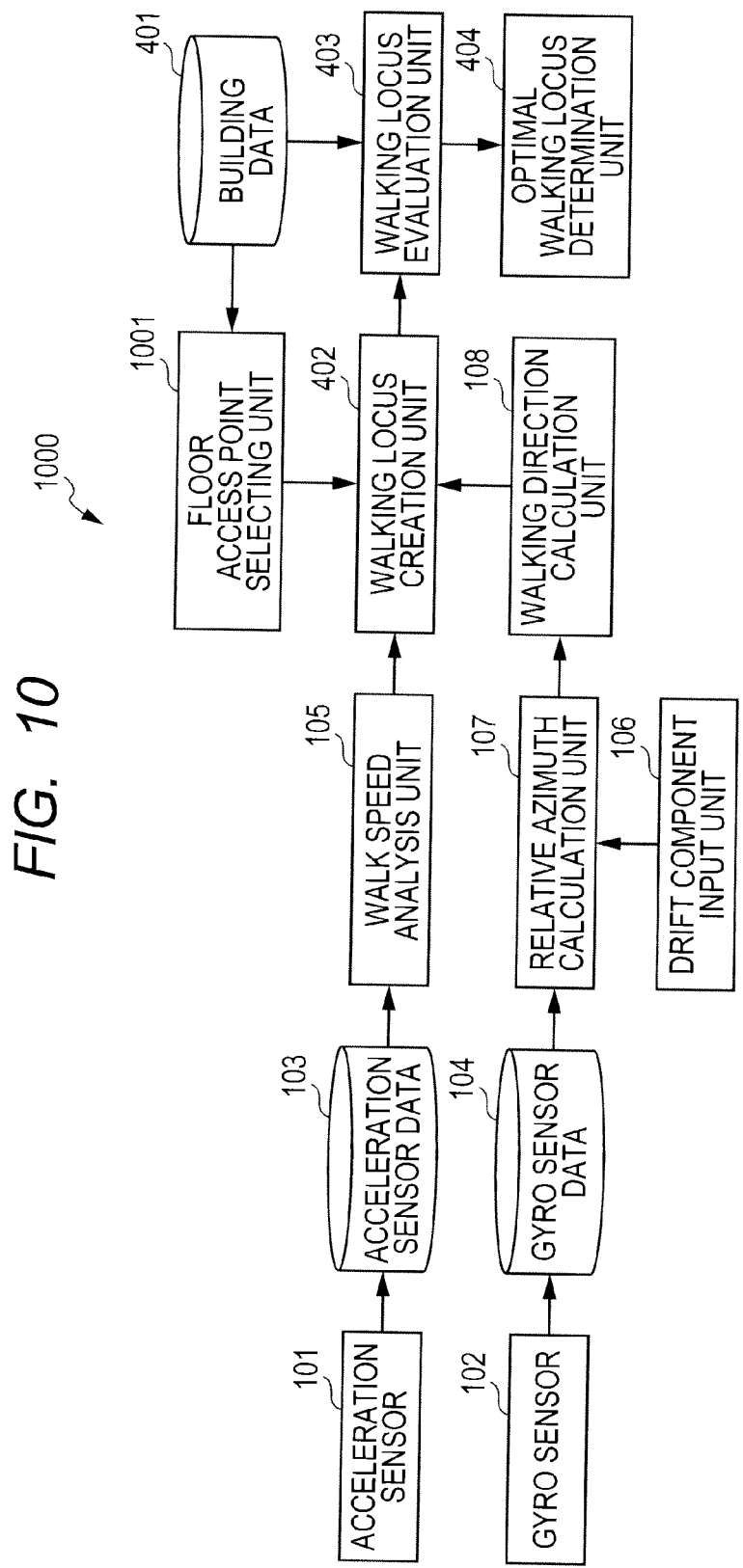
FIG. 10 is a diagram showing an example of a schematic structure of an information processing apparatus (walking locus inference apparatus) according to a sixth embodiment of the present invention.

FIG. 10 is a diagram showing a schematic structure of an information processing apparatus (walking locus inference apparatus) 1000 according to the sixth embodiment of the present invention. In addition to the structure of the information processing apparatus 400, the information processing apparatus 1000 further includes a floor access point selecting unit 1001. The floor access point selecting unit 1001 may be provided in the structure of the fourth embodiment.

The floor access point selecting unit 1001 reads building data from the building data storage unit 401, creates combinations of all starting and end points, if there are a plurality of floor access points for the floor of interest in the building data, and provides the coordinates of the respective combinations to the walking locus creation unit 402.

The walking locus creation unit 402 performs the previously described matching to building data for all walking loci, based on each of the starting and end point combination patterns. Thereby, a plurality of adjusted walking loci are created with respect to each of the starting and end point combinations. Subsequent processing is the same as described previously and all walking loci created (adjusted) are subjected to walking locus evaluation.

<Process Flow>

FIG. 11 is a flowchart for explaining a process flow up to optimal walking locus determination in the information processing apparatus 1000. In the following description, the same reference numerals are to be used to refer to the same components and steps as in FIG. 2.

The floor access point selecting unit 1001 reads data on a floor of interest from the building data storage unit 401 and, if there are a plurality of access points of the floor, creates all combinations of access points that can be starting and end points, and preserves them in the memory not shown (S1101). For example, if there are three stairways and two elevators as the access points of the floor of interest, 2×3, six combinations of starting and end points are to be created and preserved in the memory.

At S1102, the steps S201 to S204 in FIG. 6 are executed. However, the walking locus creation unit 402 performs the previously described matching (adjustment) to building data for a plurality of walking loci created corresponding to respective drift components, using the coordinates of starting and end points in each combination. Then, the walking locus creation unit 402 preserves the adjusted respective walking loci as optimal walking locus candidates in the memory not shown. Concrete processing details of the matching to building data are as described with regard to S601 (FIG. 6).

The walking locus evaluation unit 403 reads building data of interest from the building data storage unit 401 and the walking loci matched (adjusted) to building data from the memory not shown and evaluates each walking locus (S1103). Concrete processing details are as described with regard to S602 (FIG. 6).

The optimal walking locus determination unit 404 determines a walking locus having the best evaluation result as an optimal one (S1104). Concrete processing details are as described with regard to S603 (FIG. 6).

(7) Seventh Embodiment

In the first through sixth embodiments, it is presumed that it is known beforehand that each sensor data piece is data acquired within the same floor. However, practically, each information processing apparatus continuously operates from a processing start (the start of locus inference) to a processing end (the end of locus inference), during which a walker may possibly move from floor to floor and sensor data is acquired consecutively without a distinction between floors. Consequently, a range of data on the same floor is not unknown. Thus, in a seventh embodiment, the process is adapted to discern a range of data on one floor, separate sensor data per floor, and obtain a walker's locus per floor.

<Structure of Information Processing Apparatus>

Figure 12A:
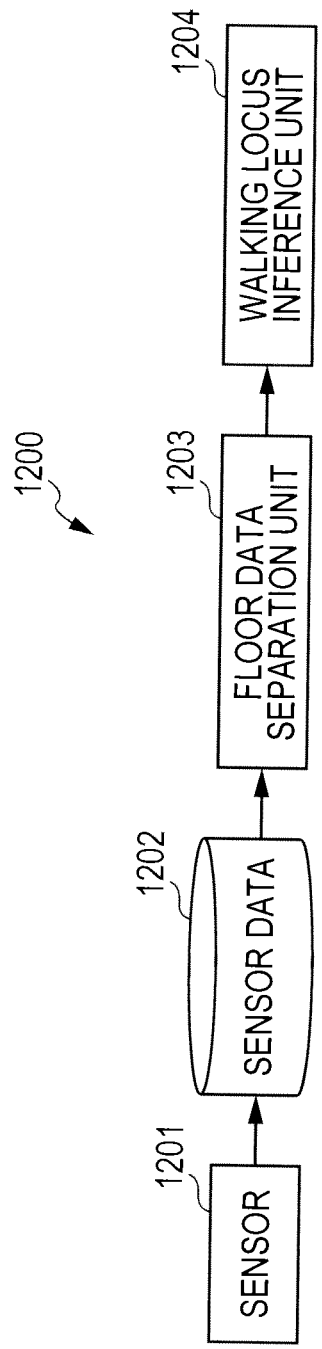
FIG. 12A is a diagram showing an example of a schematic structure of an information processing apparatus (walking locus inference apparatus) according to a seventh embodiment of the present invention.
Figure 12B:
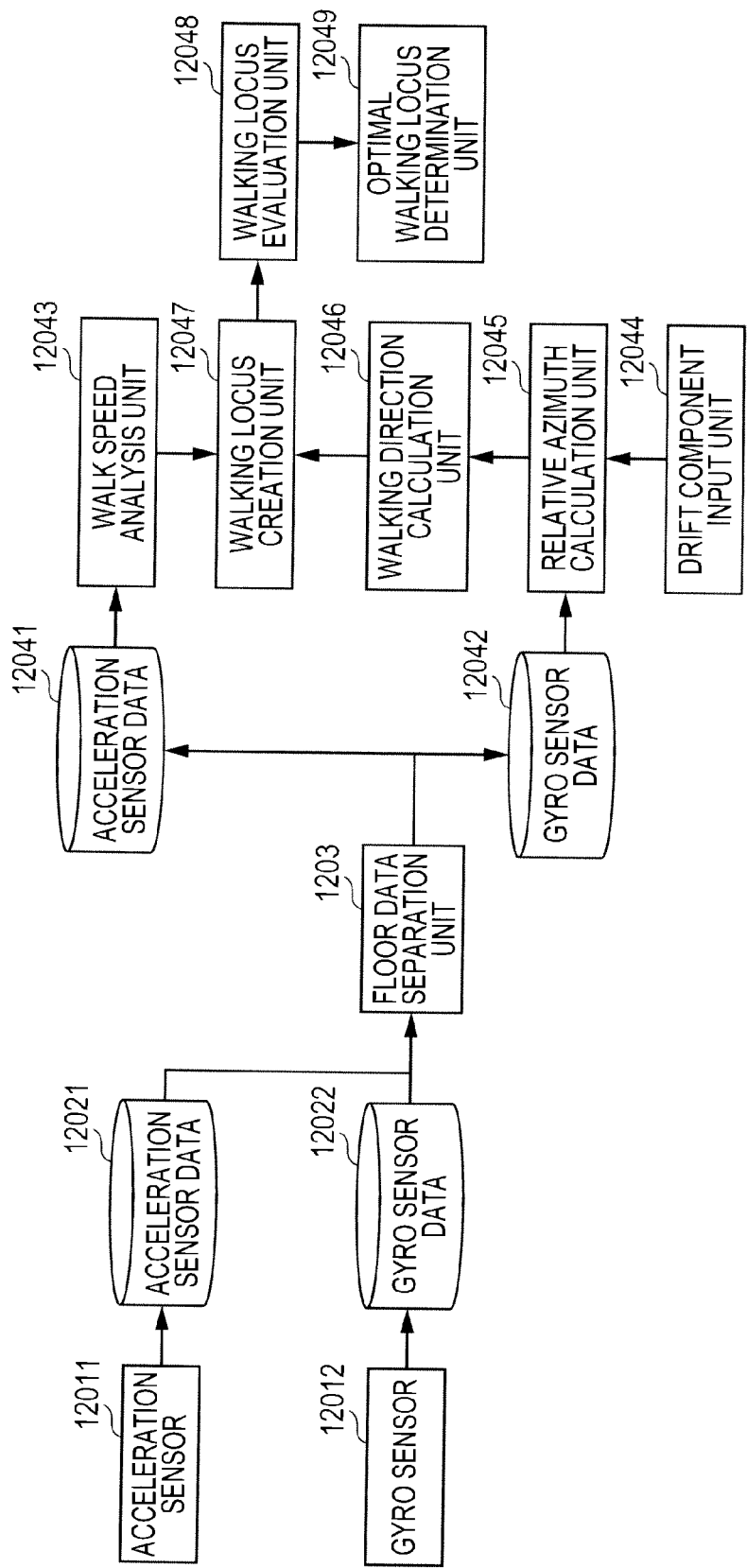
FIG. 12B shows a more detailed structure of the apparatus shown in FIG. 12A.

FIGS. 12A and 12B are diagrams showing a structure of an information processing apparatus (walking locus inference apparatus) 1200 according to the seventh embodiment. FIG. 12A shows a schematic structure thereof and FIG. 12B shows a more detailed structure thereof.

The information processing apparatus 1200 includes various sensors 1201, a sensor data storage unit 1202, a floor data separation unit 1203, and a walking locus inference unit 1204.

The various sensors 1201 include an acceleration sensor 12011 and a gyro sensor 12012 as described previously. The sensor data storage unit 1202 is comprised of an acceleration sensor data storage unit 12021 and a gyro sensor data storage unit 12022 for data acquired on all floors.

The walking locus inference unit 1204 has the same structure as the structure of the information processing apparatus 100 (which may be the structure shown in FIG. 3, 4, 7, 8 or 10) with the exception of various sensors. An acceleration sensor data storage unit 12041 and a gyro sensor data storage unit 12042 store various sensor data per floor obtained after floor data separation. Therefore, when a process of inferring a walker's loci in a particular floor is executed, various sensor data on the particular floor is to be read. If a structure including an orientation sensor data storage unit is applied to any of seventh through tenth embodiments, it should be understood that a component for orientation sensor data is added to the structure of any of the seventh through tenth embodiments (FIGS. 12 through 15).

In a case where a building which is the object of processing is made up of a plurality of floors, the floor data separation unit 1203 separates acceleration sensor data 12021 and gyro sensor data (angular velocity data) 12022 with respect to each floor. Specifically, in a building, a move from floor to floor (a move in a vertical direction) differs from a move in a horizontal direction when a walker usually walks on a floor. Hence, by finding a sensor data portion that indicates a move in a vertical direction, which is distinct from normality, it is possible to extract data per floor. For example, if a walker moves from floor to floor by a stairway, the walker's thighs will move up and down harder than usual and this results in a change in an acceleration data pattern. By extracting such a change point (change duration) from acceleration data, a time point when the walker has begun to climb up (down) stairs and a time point when the walker has just climbed up (down) stairs are extracted. In the case of an elevator, a change in gravity g occurs. Thus, by detecting such a change, it is possible to extract a section in which the walker moved from floor to floor.

After extracting a section in which the walker moved from floor to floor, the floor data separation unit 1203 removes the data on the section in which the walker moved from floor to floor from various sensor data 12021 and 12022 on all floors or appends identification information of the section or each floor and stores various sensor data on each floor in the respective storage units 12041 and 12042.

As for the walking locus inference process, the method described for the first through sixth embodiments is applied and, therefore, the relevant description in each embodiment subsection should be referred to.

(8) Eighth Embodiment

In an eighth embodiment, the floor data separation unit 1203 described in the seventh embodiment subsection is adapted to perform floor data separation processing additionally using atmospheric pressure sensor data.

Figure 13A:
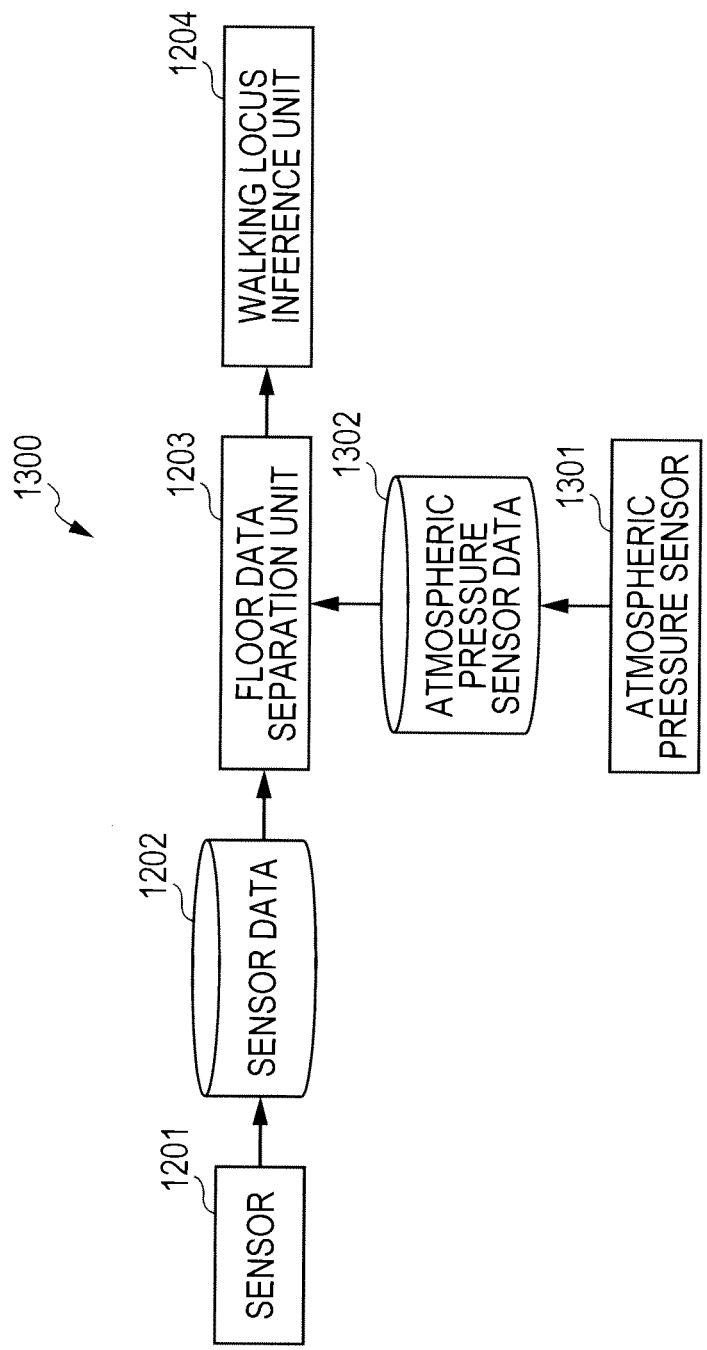
FIG. 13A is a diagram showing an example of a schematic structure of an information processing apparatus (walking locus inference apparatus) according to an eighth embodiment of the present invention.
Figure 13B:
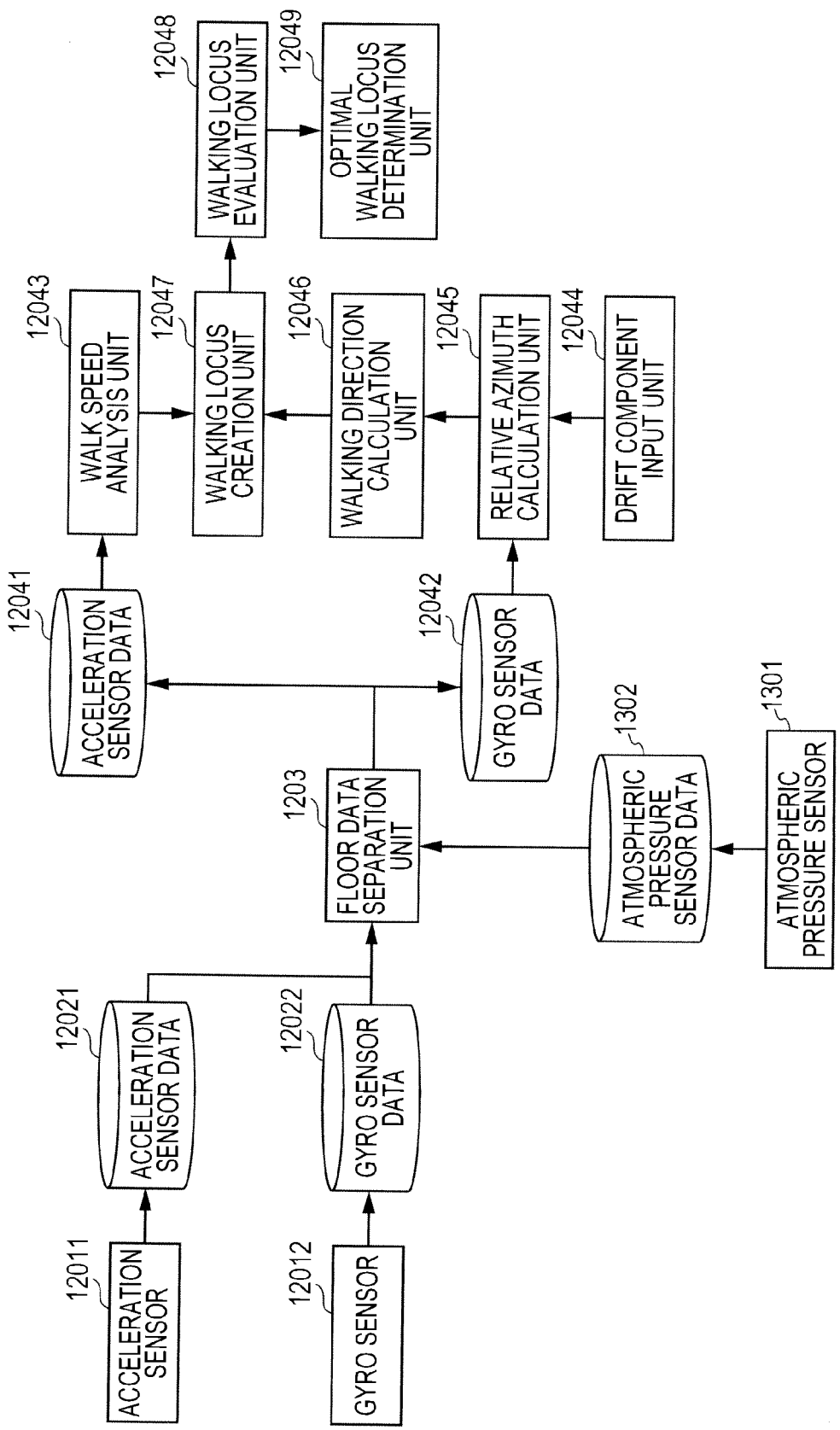
FIG. 13B shows a more detailed structure of the apparatus shown in FIG. 13A.

FIGS. 13A and 13B are diagrams showing a structure of an information processing apparatus (walking locus inference apparatus) 1300 according to the eighth embodiment. FIG. 13A shows a schematic structure thereof and FIG. 13B shows a more detailed structure thereof.

As shown in 13A and 13B, the information processing apparatus 1300 further includes an atmospheric pressure sensor 1301 and an atmospheric pressure sensor data storage unit 1302 along with the structure shown in FIGS. 12A and 12B.

It is a well-known fact that atmospheric pressure varies with height. A height difference of even one-story height varies atmospheric pressure. If a walker moves from floor to floor in a building, the atmospheric pressure changes and this change is detected by the atmospheric pressure sensor 1301.

The floor data separation unit 1203 detects that the walker moved from floor to floor by extracting a change portion in atmospheric pressure along with a change in an acceleration data pattern as described above. Besides, by atmospheric pressure sensor data, it determines which floor the walker moved to, thereby causing the change in the atmospheric pressure data. In the seventh embodiment, it is needed to trace which floor data is sequentially from the data at the start of a move. In the eighth embodiment, it thus becomes possible to immediately know various sensor data on which floor by joining an extracted portion of various sensor data changing for a period of time and an extracted portion of atmospheric pressure sensor data changing for the period of time.

(9) Ninth Embodiment

In a ninth embodiment, the floor data separation unit 1203 described in the seventh embodiment subsection is adapted to perform floor data separation processing additionally using GPS data.

Figure 14A:
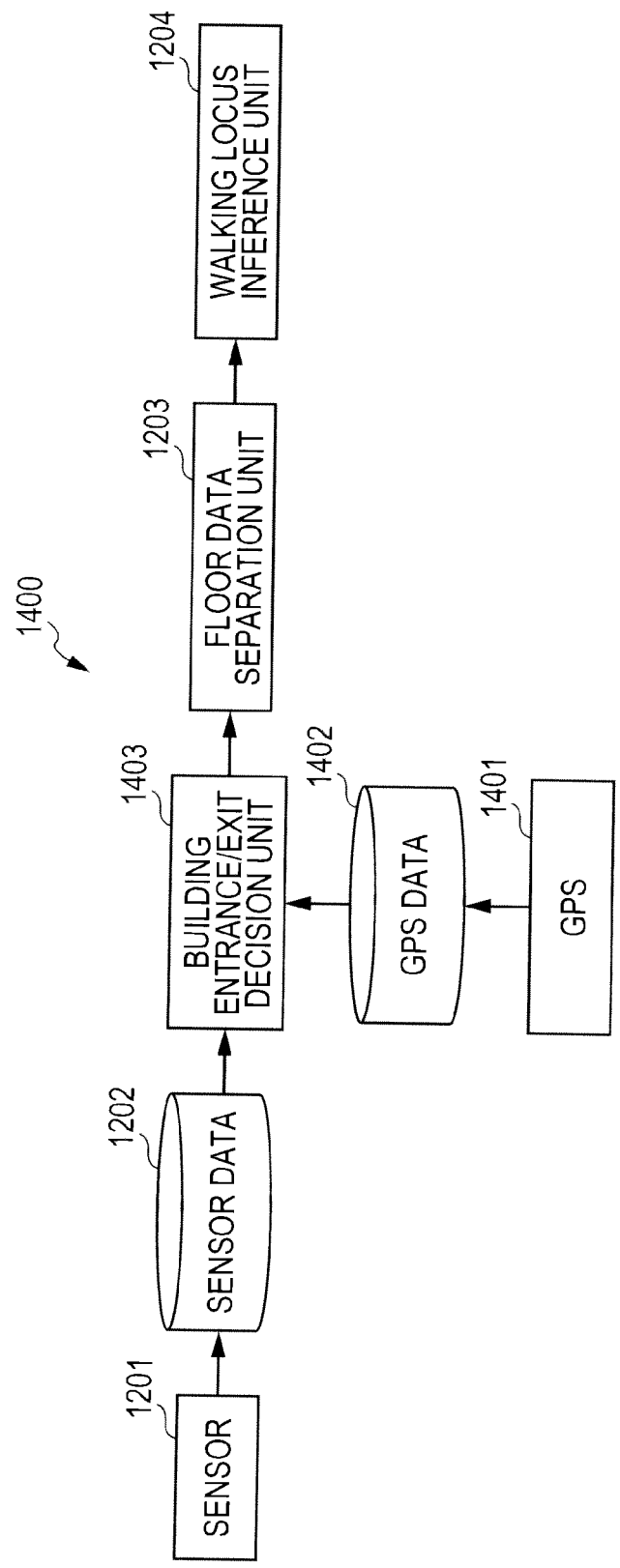
FIG. 14A is a diagram showing an example of a schematic structure of an information processing apparatus (walking locus inference apparatus) according to a ninth embodiment of the present invention.
Figure 14B:
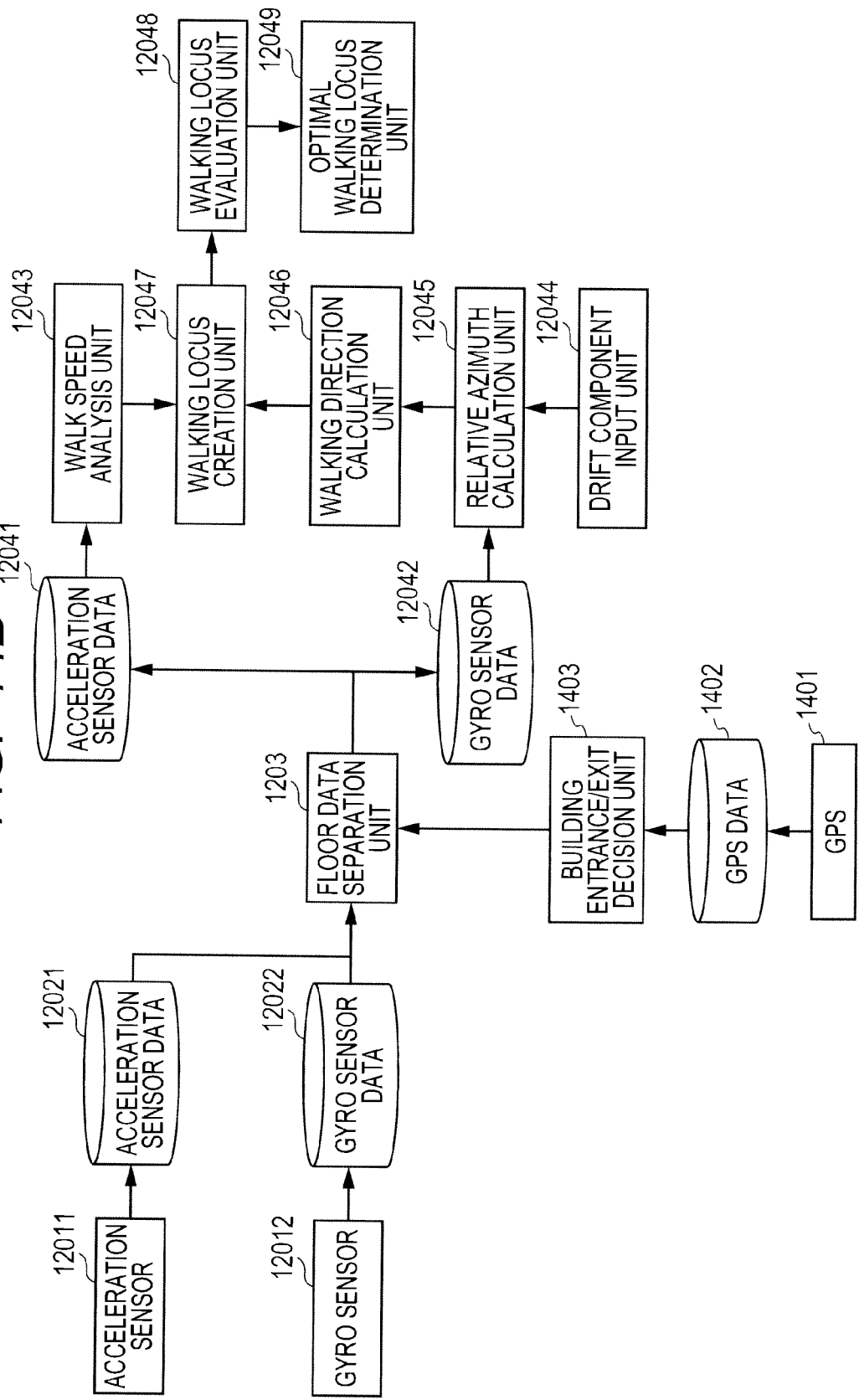
FIG. 14B shows a more detailed structure of the apparatus shown in FIG. 14A.

FIGS. 14A and 14B are diagrams showing a structure of an information processing apparatus (walking locus inference apparatus) 1400 according to the ninth embodiment. FIG. 14A shows a schematic structure thereof and FIG. 14B shows a more detailed structure thereof.

As shown in FIGS. 14A and 14B, the information processing apparatus 1400 further includes a GPS 1401, a GPS data storage unit 1402, and a building entrance/exit decision unit 1403 along with the structure shown in FIG. 12.

In a case where the scope of walking locus inference covers a plurality of buildings, it is impossible to know which building the walker entered and which building the walker exited according to the structure of FIG. 12. So, management of an entrance into and an exit from a building is conducted using the GPS 1401.

The GPS 1401 operates outside a building, but does not operate inside the building and its measurement data is lost once a walker has entered the building. By making use of this nature of the GPS, it is possible to know which building the walker has entered. That is, the building entrance/exit decision unit 1403 is able to know which building the walker has entered by cross-checking positioning data by the GPS 1401 and building position data. When the walker exits a building, GPS data acquisition abruptly resumes after positioning data is not being acquired by the GPS 1401 for some time. By the positioning data acquired at that time and building position data, it is possible to identify the building from which the walker has exited. If buildings are not interconnected by an accessway or the like, exiting from which building can be known only by the positioning data.

In the way described above, the apparatus knows which building and which floor from where sensor data is now acquired and creates walking loci of a walker on each floor.

(10) Tenth Embodiment

In a tenth embodiment, the floor data separation unit 1203 described in the seventh embodiment subsection is further adapted to perform floor data separation processing by supplementing coordinates information with entrance/exit management information acquired by an RFID system.

Figure 15A:
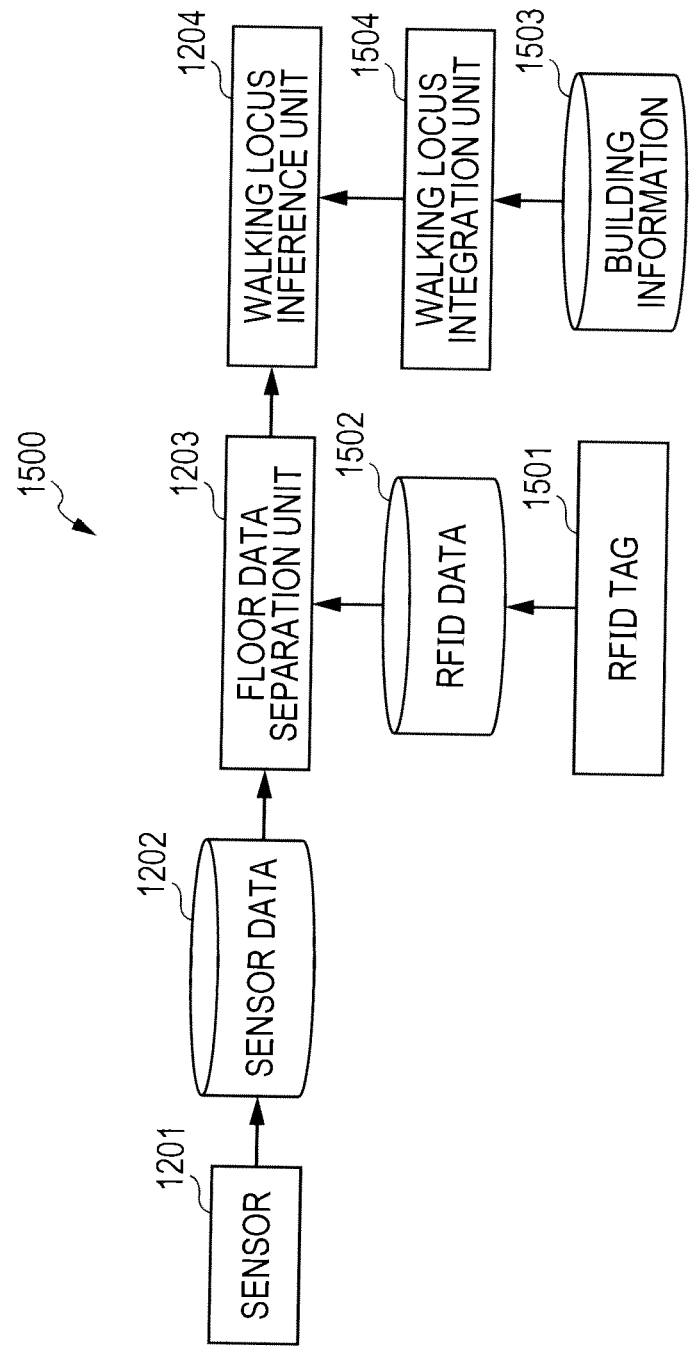
FIG. 15A is a diagram showing an example of a schematic structure of an information processing apparatus (walking locus inference apparatus) according to a tenth embodiment of the present invention.
Figure 15B:
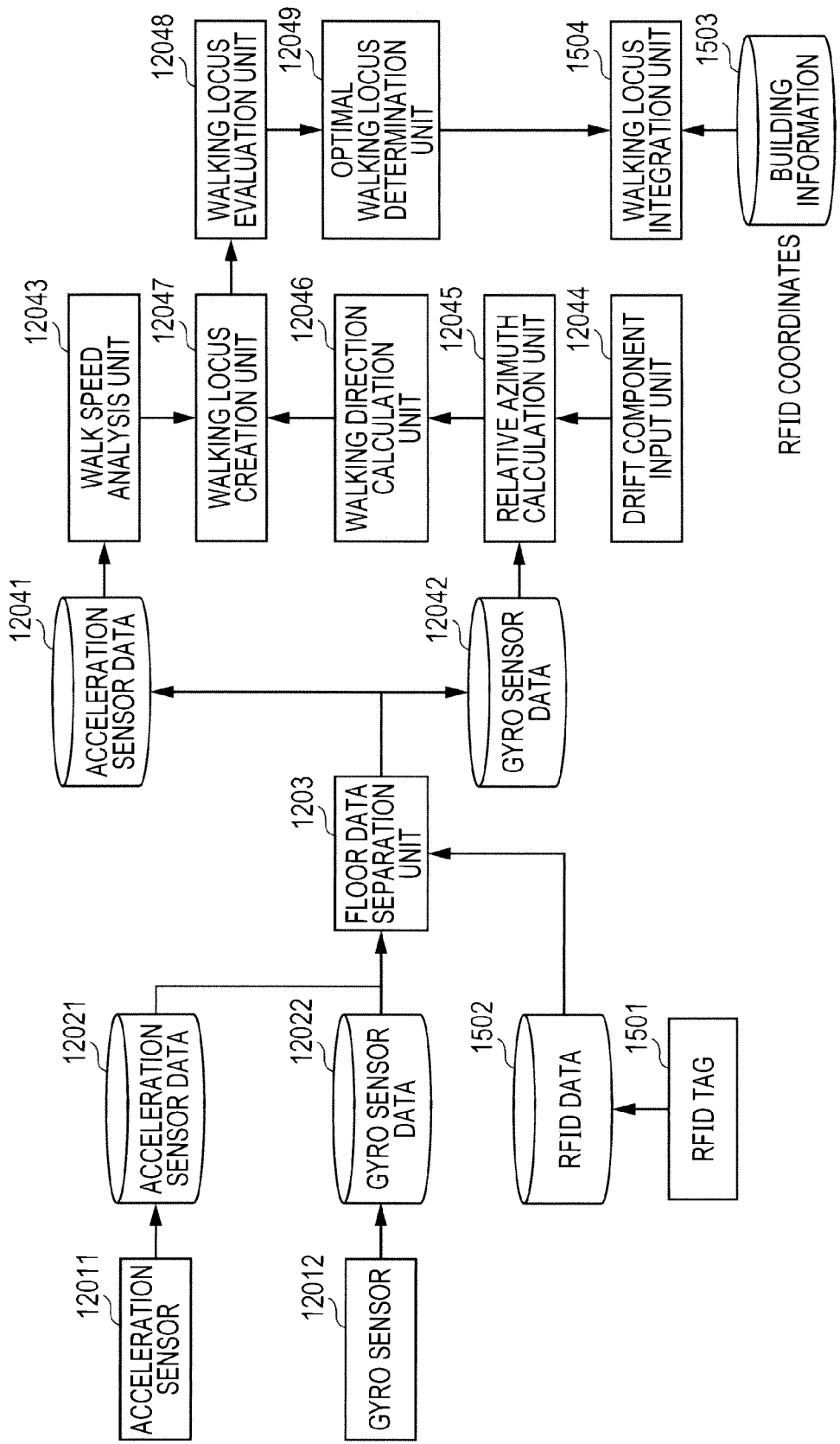
FIG. 15B shows a more detailed structure of the apparatus shown in FIG. 15A.

FIGS. 15A and 15B are diagrams showing a structure of an information processing apparatus (walking locus inference apparatus) 1500 according to the tenth embodiment. FIG. 15A shows a schematic structure thereof and FIG. 15B shows a more detailed structure thereof.

As shown in FIGS. 15A and 15B, the information processing apparatus 1500 further includes at least one RFID tag 1501, an RFID data storage unit 1502, a building information storage unit 1503, and a walking locus integration unit 1504 along with the structure shown in FIG. 12.

The RFID tag 1501, when a walker has passed a given point in a building, manages a time instant when the walker has passed the point together with the walker's ID and stores it into the RFID data storage unit 1502.

The building information storage unit 1503 stores intra-building information (in-building map information) associated with a position in which each RFID tag 1501 is installed.

The walking locus integration unit 1504 reads information on each floor of a building of interest from the building information storage unit 1503, associates each of walking loci, created and determined as optimal with respect to each floor, with information on each floor, and integrates the walking loci. This yields a walker's walking locus from a time point of start of measurement on the walker by various sensors 1201 up to a time point when the measurement terminated. Besides, it is possible to know which part of the locus corresponds to a locus on which floor and a position (temporal position) in the total walking locus.

The floor data separation unit 1203 detects that a walker moved from floor to floor by at least one of acceleration data and angular velocity data, as described in the seventh embodiment subsection. Besides, it knows which floor the walker moved to by supplementing data for a section in which the walker moved from floor to floor with the coordinates (absolute position) data of the RFID tag 1501.

Figure 16:
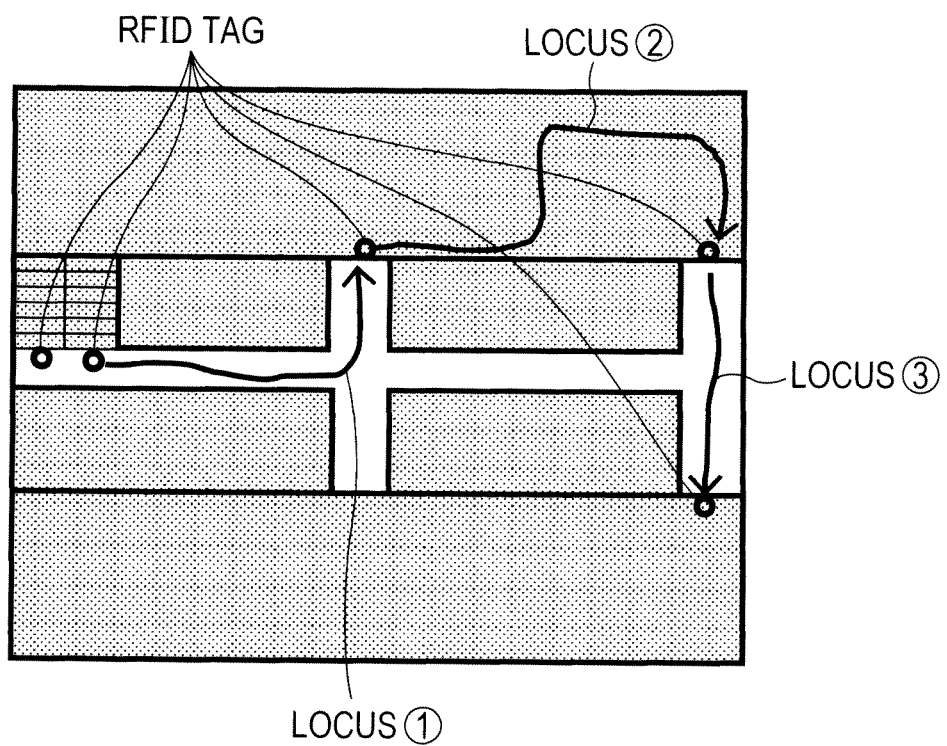
FIG. 16 is a diagram for explaining a method that segments sensor data by RFID tags and obtains a locus in the tenth embodiment.

In a case where a plurality of RFID tags 1501 are installed within a floor, as shown in FIG. 16, the floor data separation unit 1203 may extract various sensor data between each RFID tag and obtain a walking locus between each tag. In this way, by segmenting sensor data from which a locus is obtained, it is possible to obtain a locus independently for a section corresponding to each segment without being affected by data on another section. Thus, a more accurate locus can be obtained. If trying to obtain one locus using all data on a same floor, noise removal processing is performed, assuming that same noise data exists with respect to all data. However, because sensor data acquired by various sensors changes over time, noise also changes over time. Thus, by obtaining noise components for each locus segment (between each RFID tag 1501) and reflecting a change in the noise over time, a locus can be obtained accurately.

(11) Application Examples

<System Configurations>

Figure 17:
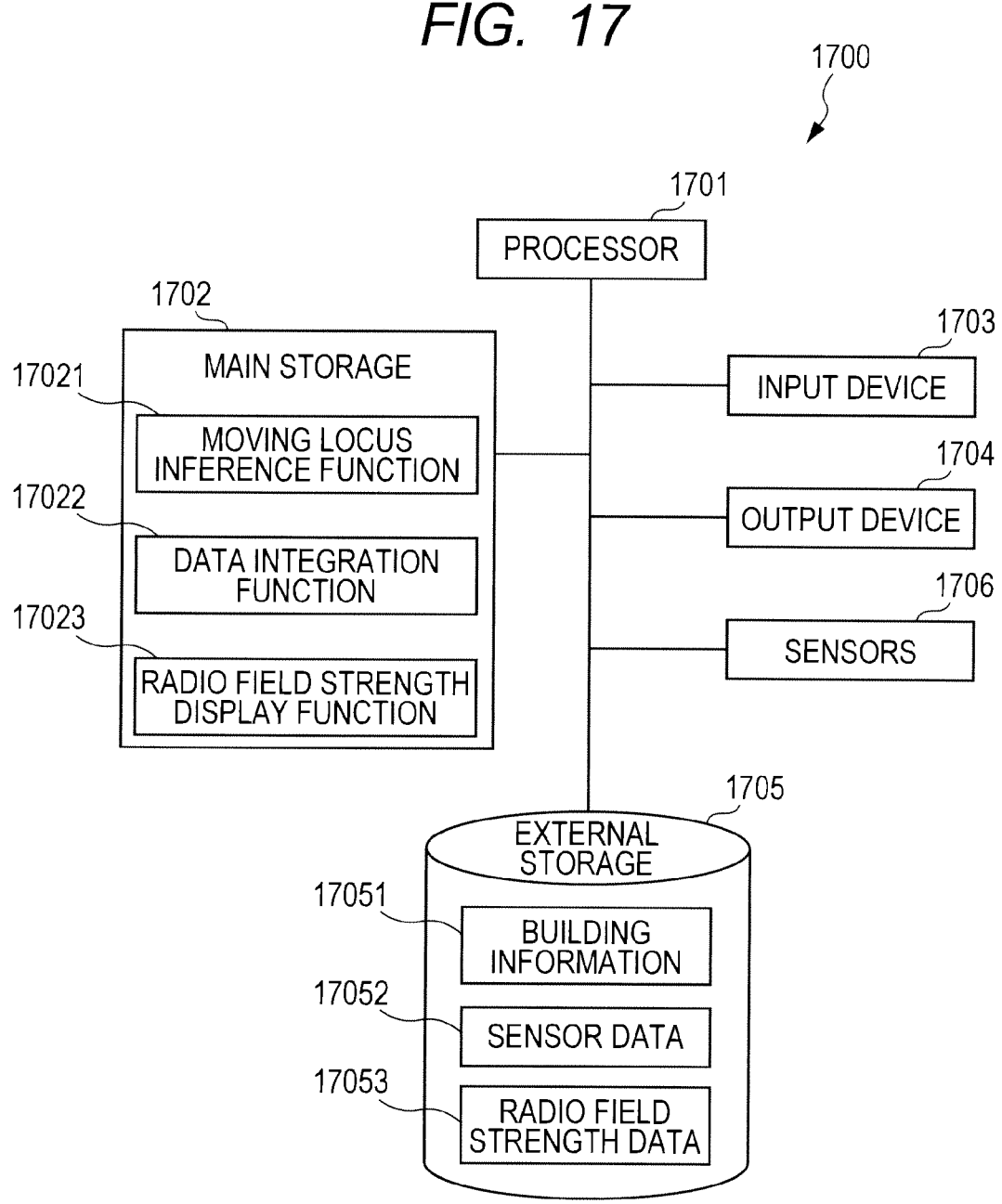
FIG. 17 is a diagram showing a schematic structure of an information processing apparatus according to an application example of the present invention.

(i) FIG. 17 is a diagram showing a schematic structure of an information processing system (radio field strength information providing system) 1700 that integrates and provides a moving locus in a building obtained by the walking locus inference apparatus according to the first through tenth embodiments and radio field strength measured in the building.

The information processing system 1700 includes a processor 1701 including a CPU or MPU, a memory, etc., a main storage 1702 storing programs and control data for implementing various functions, an input device 1703 comprised of a keyboard, a mouse (pointing device), etc., an output device 1704 comprised of, a printer, a display, etc., an external storage 1705 storing each data piece necessary to associate and provide radio field strength information and a moving locus, and various sensors 1706 including an acceleration sensor and a gyro sensor (which may further include an orientation sensor).

The main storage 1702 stores a moving locus inference function (which may be termed a moving locus inference program differently) 17021 which is a program that implements a walking locus creation function of the walking locus inference apparatus according to the first through tenth embodiments, a data integration function (which may be termed a data integration program differently) 17022 which is a program that integrates radio field strength information and a walking locus, and a radio field strength display function (which may be termed a radio field strength display program differently) 17023 which is a program for outputting integrated data to the output device 1704 as a radio field strength display. These programs are read by the processor 1701, opened into a RAM not shown (within the processor 1701), and executed.

In a case in which information sets for a plurality of buildings are prepared, the input device 1703 is used for a user to enter at least a selection of which building for which a walking locus and radio field strength in the building are to be associated and displayed.

The output device 1704 is used to output data integrated by the data integration function 17022.

The external storage 1705 stores building information 17051 on at least one building, including the building outline (the coordinates of vertices of the outline) and information for floor access points (the category and coordinates of each access point), sensor data 17052 which is various sensor data (data measured at a mobile terminal) described in each of the first through tenth embodiments, including some of, e.g., time-stamped acceleration data, angular velocity data, orientation data, geomagnetic data, atmospheric pressure data, GPS data, RFID data, etc. (these sorts of data being associated with time points), and radio field strength data 17053 which is time-stamped radio field strength measured in predetermined or arbitrary positions in the building in conjunction with moving of a walker (radio field strength being associated with time points).

When various sensor data is measured, data may be measured and associated with building information (which building is identified) and a moving locus may be created associated with information on a particular building. In this case, only by selecting a building through the input device 1703, a user can get an associated moving locus easily. Alternatively, even if a moving locus is not associated with building information, it can be identified which building in which the locus is obtained by tracing the locus. In a case in which a moving locus is acquired by having a checker carry the information processing apparatus 1700 or a mobile terminal 1802 (FIG. 18), it is easily possible to associate a building and a moving locus from data such as a check schedule. Besides, if the information processing apparatus 1700 is provided with a GPS function, associating a building and a moving locus is easier.

Figure 18:
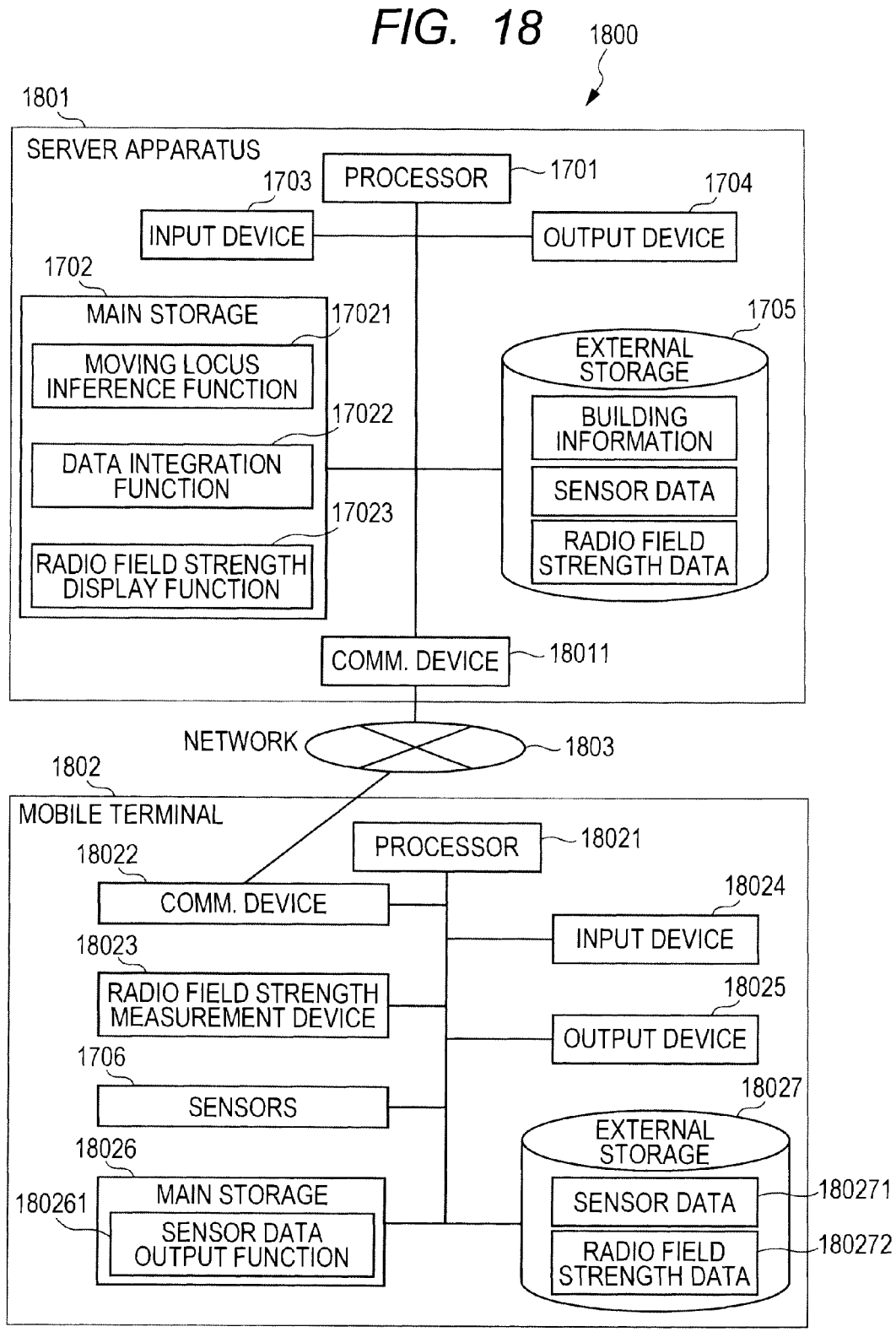
FIG. 18 is a diagram showing a schematic structure of an information processing system according to an application example of the present invention.

(ii) Meanwhile, FIG. 18 is a diagram showing a schematic structure of an information processing system (radio field strength information providing system) 1800 that is comprised of a server apparatus 1801 and a mobile terminal 1802 connected via a network 1803.

The server apparatus 1801 has the same structure as the information processing apparatus 1700 shown in FIG. 17, except that it does not have various sensors 1706 and additionally includes a communication device 18011. Therefore, in FIG. 18, components corresponding to those of the information processing apparatus 1700 are assigned the same reference numerals.

The mobile terminal 1802 includes a processor 18021 including a CPU or MPU, a memory, etc., a communication device 18022 for transmitting measurement data and various sensor data to the server apparatus 1801 and receiving a given request from the server apparatus 1801, a radio field strength measurement device 18023 that measures radio field strength inside and outside a building and outputs measured radio field strength data with the measurement time point, an input device 18024 comprised of a keyboard, a touch panel (pointing device), etc. an output device 18025 such as a display or the like, various sensors 1706, a main storage 18026 storing a sensor data output function (which may be termed a sensor data output program differently) 180261 which is a program for implementing a function of outputting various sensor data detected by the various sensors, and an external storage 18027 storing time-stamped various sensor data 180271 and time-stamped radio field strength data 180272.

The network 1803 may be, but not limited to, a LAN (Local Area Network) or Internet.

<Processing Details>

Figure 19:
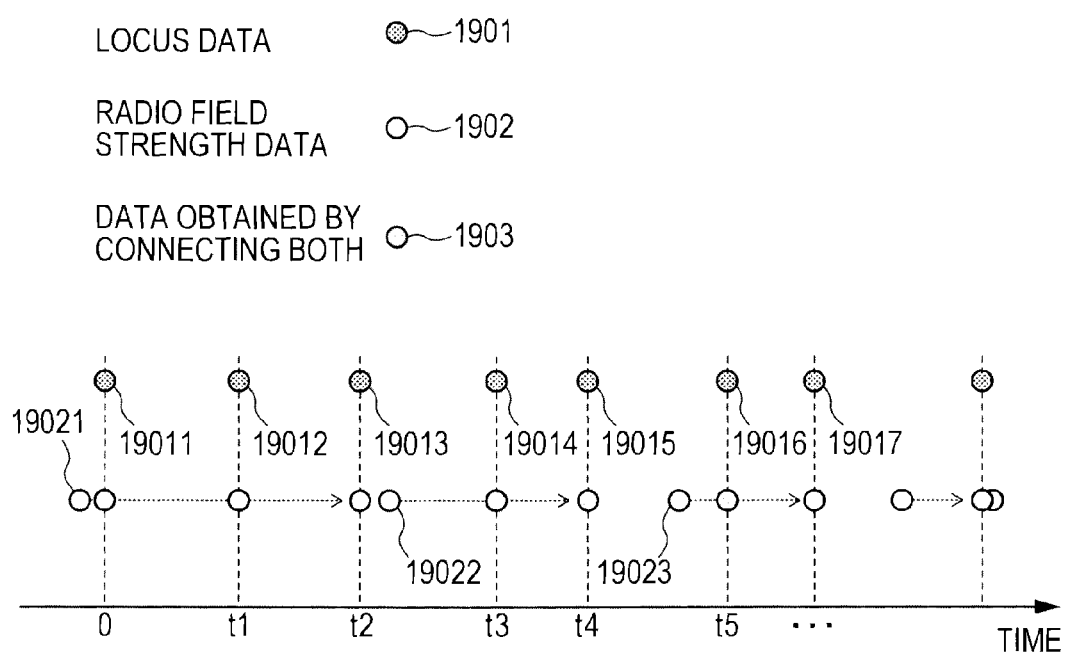
FIG. 19 is a diagram to explain processing that is connecting (associating) locus data and radio field strength data.

FIG. 19 is a conceptual diagram to explain processing that is connecting (associating) an inferred moving locus (walking locus) of a walker and measured radio field strength data by the data integration function 17022.

As shown in FIG. 19, time points of inferred locus data 1901 and time points of radio field strength data 1902 do not always synchronize. This is because measurement (acquisition) time points (sampling rate) of various sensor data, on the basis of which a walking locus is created, and measurement (acquisition) time points of radio field strength may not synchronize. Because both, as is, cannot be associated, radio field strength data is interpolated to associate both.

Specifically, if locus data exists between two measurement time points of radio field strength data, radio field strength data measured at an earlier time point is associated with the locus data. As shown in FIG. 19, for example, the data integration function 17022 connects radio field strength data 19021 to locus data 19011 to 19013, connects radio field strength data 19022 to locus data 19014 and 19015, and connects radio field strength data 19023 to locus data 19016 and 19017. Although, in FIG. 19, radio field strength data is interpolated according to a value of radio field strength data measured at an earlier time point, the following may be used: an interpolation method that averages values indicated by radio field strength data measured at two time points or a method for interpolating radio field strength data between two time points by weighting according to the two values.

<Radio Field Strength Display>

Figure 20A:
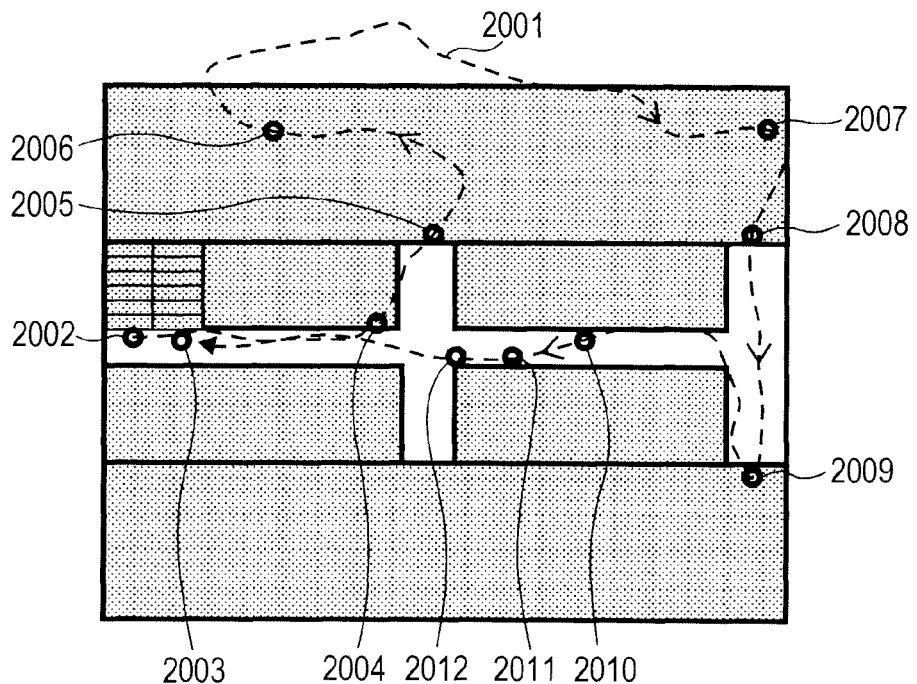
FIGS. 20A and 20B are diagrams showing an example of displaying connected data (normal)
Figure 20B:
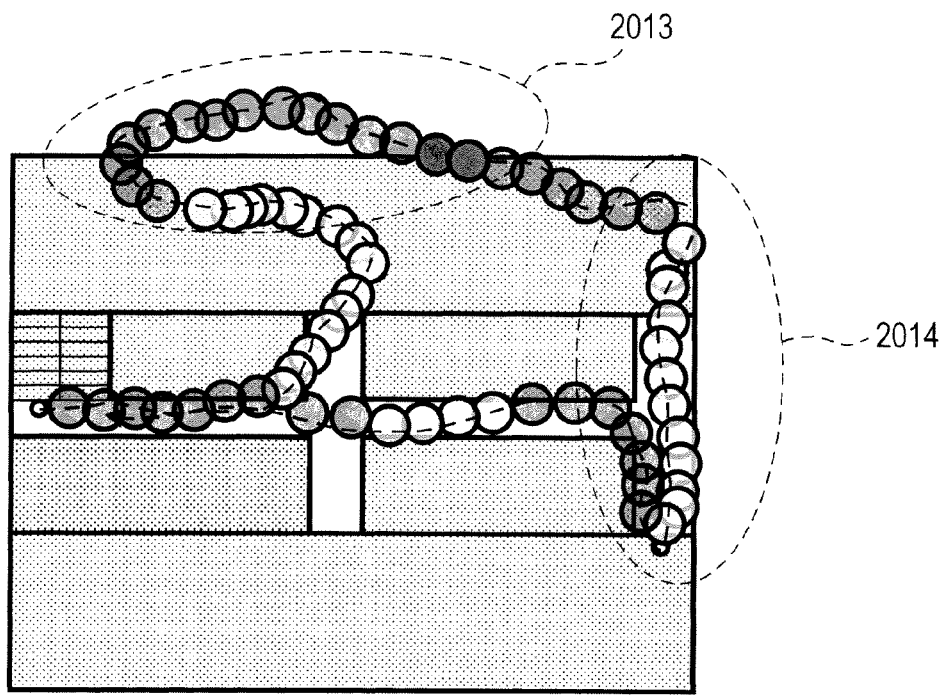
Figure 21A:
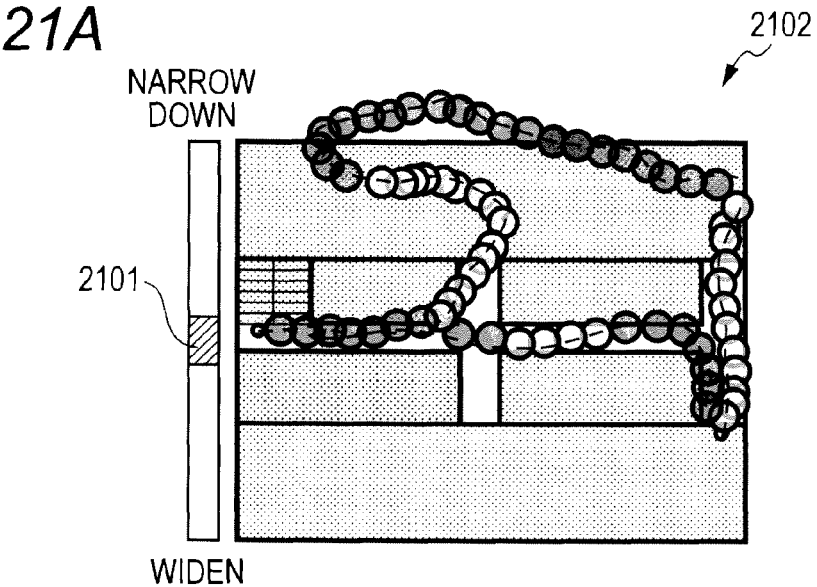
FIGS. 21A, 21B, and 21C are diagrams showing examples of displaying connected data (a widened display and a narrowed down display).
Figure 21B:
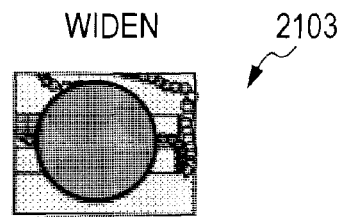
Figure 21C:
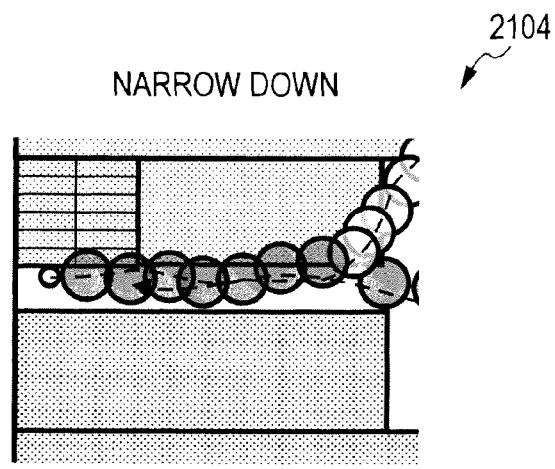

FIGS. 20 and 21 are diagrams showing examples of displaying information obtained by connecting locus data and radio field strength data. FIGS. 20A and 20B show a basic display example. FIGS. 21A, 21B, and 21C show examples in which an enlarged display and a narrowed down display are possible. The radio field strength display function 17023 executes such display processing.

(i) In FIG. 20A, a created walking locus is drawn by a dashed line 2001 and each of measured radio field strength data is shown as circles 2002 to 2012. Radio field strength data is interpolated using each radio field strength data 2002 to 2012 and displayed over the walking locus 2001, as is shown in FIG. 20B. In FIG. 20B, a gray degree of each radio field strength data represents how strong the measured radio field is; and a darker circle drawn indicates a stronger radio field.

In FIGS. 20A and 20B, a locus portion 2013 of the walking locus 2001 goes out of the building area. So, the walking locus 2001 may be corrected to fall within the building area, using locus correction processing (see FIGS. 8 and 9) described with regard to the eighth embodiment. However, if the entire walking locus 2001 is scaled down, a locus portion 2014 that runs on a passage as a result of accurate locus inference that is successful will go out of the passage. In this case, it may be expedient that locus correction is not performed for the locus portion 2014, not subjecting the entire walking locus 2001 to the previously described locus correction processing.

(ii) As shown in FIG. 21A, a radio field strength display is made up of a scale bar 2101 and a display area 2102. FIG. 21A shows a normal display form. Granularity of a display varies depending on a position of the scale bar 2101. In the case of normal display, the scale bar 2101 is, for example, positioned in the center. When moving the scale bar 2101 toward "widen", the display switches to a widened display 2103 (FIG. 21B). At this time, radio field strength is displayed densely. When moving the scale bar 2101 toward "narrow down", the display switches to a narrowed down display 2104 in which a part of a building is enlarged (FIG. 21C). A relation between display granularity and positions of the scale bar 2101 is predetermined.

(12) Overview

In the first embodiment, the process (walking locus inference process) analyzes a moving speed (walk speed) using acceleration data acquired by the acceleration sensor and calculates a moving distance of a moving object (a walker or possibly a moving object such as a robot). A plurality of candidate values of drift components are given, the process removes each of them from angular velocity data acquired by the gyro sensor and generates a plurality of relative azimuths data pieces. Further, by integrating the respective relative azimuths data pieces, the process calculates a plurality of moving directions of the object (without taking account of an absolute orientation). Using information on the moving distance and the moving directions, the process creates a plurality of moving loci corresponding to the plurality of candidate values of drift components. In turn, by comparing the positions of actual starting and end points of moving in a building (which are known beforehand or given) with the positions of starting and endpoints of each of the moving loci, the process evaluates the moving loci and determines a moving locus having the best evaluation result as an optimal one. In the second embodiment, the process calculates moving directions taking account of an absolute orientation. Doing so makes it possible to accurately infer a walking locus from which the influence of noise at the gyro sensor is removed. Because the width of a step and the size of drift components which are given can be changed appropriately, it will become able to give more suitable drift components, while continuing to use the walking locus inference apparatus (information processing apparatus). Consequently, it becomes possible to infer a more accurate moving locus.

When comparing the positions of actual starting and end points of moving in a building with the positions of starting and end points of each of the moving loci, in particular, the following processing is performed. If the starting and end points differ, the starting point of a moving locus is adjusted to the actual starting point and the moving locus is rotated so that the end point of the locus will come in a position nearest to the actual end point. In turn, the process evaluates a moving locus by a positional relation between both end points.

On the other hand, if the starting and end points are the same, the process evaluates a moving locus by a distance between the starting and end points of the locus.

(ii) In the third embodiment, the following processing is performed for moving loci created as described above.

If the actual starting and end points differ, the process performs at least one of rotation, scaling down and scaling up for each of the moving loci. In turn, the process adjusts the starting and end points of each moving locus to the actual starting and end points of moving and creates a plurality of adjusted moving loci. When evaluating the moving loci, the process takes building data on the building structure and evaluates each of the adjusted moving loci as to whether it falls within the building outline. Among the moving loci falling within the building outline, the process determines an adjusted moving locus of the longest moving distance as an optional one.

On the other hand, if the actual starting and end points are the same, the process calculates for each of plurality of moving loci a difference in distance between the starting and end points of the locus and an in-building ratio by which the locus falls within the building outline. In turn, the process determines an optimal moving locus, based the difference and the in-building ratio. In the way described above, it becomes possible to infer an optimal moving locus, whether the starting and end points of moving differ or the same.

(iii) In the fourth embodiment, the process calculates moving directions taking account of an absolute orientation given by orientation sensor data in addition to the third embodiment. Because the process calculates moving directions taking account of an absolute orientation in this way, the process can evaluate moving loci created without rotating them and processing when evaluating them can be simplified.

(iv) In the fifth embodiment, based on building data, the process corrects an optimal locus by performing at least one of scaling up, scaling down, rotation, and displacement for an optimal moving locus determined. As shown in FIGS. 9A and 9B, a moving locus is corrected to fall within a position (range) where it should lie practically. By doing in this way, it is possible to correct a locus easily even if an error is made in moving speed analysis. If a created walking locus does not coincide with the internal structure of a building, the process may feed back offsets to the walk speed analysis unit and walk speed analysis may be performed again.

(v) In the sixth embodiment, on the presumption that actual starting and end points of moving are unknown, the process creates all combinations of (a plurality of) access points that can be starting and end points from building data and adjusts a moving locus using the respective combinations. As described previously, if the starting and endpoints differ, the process adjusts the starting point of a locus to the actual starting point and adjusts the moving locus. However, in this embodiment, because the process adjusts a moving locus with respect to all combinations of actual starting and end points, it becomes possible to infer a suitable moving locus even if the coordinates of actual starting and endpoints are unknown.

(vi) In the seventh embodiment, the process extracts a section in which an acceleration data pattern changes and detects that a walker moved from floor to floor. In turn, the process separates various sensor data into data per floor and creates walking locus information on each floor. In this way, it is possible to proceed with processing without becoming confused by a distinct pattern in acceleration data (a pattern appearing when a walker moves from floor to floor). The process obtains a locus on each floor, recognizing floor to floor difference. Thus, it is possible to obtain a walking locus easily and accurately, even if measurements are taken by various sensors for long time.

(vii) In the eighth embodiment, the process detects moving from floor to floor taking account of a change in atmospheric pressure as well and separates sensor data per floor. Because atmospheric pressure changes with moving to a different floor, it is possible to detect moving from floor to floor more accurately.

(viii) In the ninth embodiment, the process determines whether the object has entered or exited a building taking account of GPS data, separates sensor data per floor in the same building, and obtains a walking locus. The process may not detect that a walker (moving object) moved from building to building from only acceleration data. So, the process locates a walker being outside by GPS data and distinguishes between different buildings. Thereby, it becomes possible to ensure that obtained walking loci are those within the same building.

(ix) In the tenth embodiment, the process separates sensor data taking account of RFID data as well. Because positions where RFID tags are installed are known, it is possible to easily know a position where sensor data is acquired. Even on the same floor, a locus can be divided with respect to each section between installed RFID tags and noise in sensor data can be removed. Thus, a locus can be adapted for a change in the noise amount due to a change in indoor environment. It becomes possible to obtain a walking locus more accurately.

(x) An example of application of the present invention integrates data by associating (connecting) a walking locus obtained by any of the first through tenth embodiments with indoor radio field strength measured discretely and presents the integrated data to a user. Thereby, it is possible to easily know what degree of radio field strength is measured in which position inside a building. By having a person who moves inside a building carry the apparatus relevant to the application example, radio field strength can be measured between whiles in doing another work. Thus, it becomes unnecessary to hire an operator for measuring radio field strength and the cost for radio field strength measurement can be reduced.

(xi) The present invention can be implemented by software program code that implements the functions of the embodiments. In this case, a storage medium having the program code is recorded thereon is provided to the system or apparatus and the computer (or CPU or MPU) of the system or apparatus reads the program code stored on the storage medium. In this case, the program code itself read from the storage medium implements the functions of the previously described embodiments and the program code itself and the storage medium on which it is stored embody the present invention. As the storage medium for supplying such program code, for example, any of the following is used: a flexible disk, CD-ROM, DVD-ROM, hard disk, optical disk, magnetic optical disk, CD-R, magnetic tape, nonvolatile memory card, ROM, etc.

Alternatively, OS (operating system) or the like running on the computer may execute a part or the whole of an actual process according to instructions of program code and the functions of the previously described embodiments may be implemented by the process. Moreover, after program code read from the storage medium is written into a memory on the computer, the CPU or the like of the computer may execute apart or the whole of an actual process according to instructions of the program code and the functions of the previously described embodiments may be implemented by the process.

Moreover, software program code that implements the functions of the embodiments may be distributed via a network and stored into a storage means such as a hard disk or memory of the system or apparatus or a storage medium such as a CD-RW or CD-R. In use, the computer (or CPU or MPU) of the system or apparatus may read and execute the program code from the storage means or storage medium.

Finally, it needs to be understood that the process and technique described herein is not essentially related to any specific equipment or device and can be implemented by any suitable combination of components. Moreover, a variety of types of devices intended for general use can be used according to the teaching described herein. In order to execute the steps of the method described herein, building a specialized device may be appreciated to be beneficial. Also, diverse inventions can be formed by an appropriate combination of a plurality of components disclosed in the embodiments. For example, some components may be removed from among all components presented in the embodiments. Besides, components across different embodiments may be combined appropriately. Although the present invention has been described in connection with concrete examples, these examples are provided for illustrative purpose, but not limiting purpose in any respects. A person skilled in the art of this field may appreciate that there are many combinations of hardware, software, and firmware suitable for carrying out the present invention. For example, the described software can be implemented by a wide variety of programs or script languages such as assembler, C/C++, perl, Shell, PHP, and Java (a registered trademark).

Besides, control lines and information lines considered as necessary for explanatory purposes are shown with regard to the foregoing embodiments. For products, all the control lines and information lines are not necessarily shown. All components may be interconnected.

In addition, other implementations of the present invention may be apparent to a person having ordinary knowledge in the art of this field from consideration of the specification and embodiments of the present invention disclosed herein. Various aspects of the described embodiments and/or their components can be used solely or in any combination. The specification and concrete examples are only typical and the scope and spirit of the present invention are set forth in the claims that follow.

What is claimed is:

1. An information processing apparatus configured to create information representing a locus of an object moving in a building, using data acquired by an acceleration sensor and data acquired by a gyro sensor, the information processing apparatus comprising:

a moving speed analysis unit that is configured to analyze a moving speed using acceleration data acquired by the acceleration sensor and calculate moving distance of the object;

a relative azimuth calculation unit that is configured to remove each of a plurality of given candidate values of draft components from angular velocity data acquired by the gyro sensor and generate a plurality of relative azimuths data pieces;

a moving direction calculation unit that is configured to calculate a plurality of moving directions of the object, based on the respective relative azimuths data pieces generated by the relative azimuth calculation unit;

a moving locus creation unit that is configured to create a plurality of moving loci corresponding to the plurality of candidate values of draft components, using information on the moving distance calculated by the moving speed analysis unit and information on the moving directions calculated by the moving direction calculation unit;

a moving locus evaluation unit that is configured to evaluate the plurality of moving loci by comparing the positions of actual starting and end points of moving in the building with the positions of starting and end points of each of the moving loci; and an optimal moving locus determination unit that is configured to determine an optimal moving locus out of the plurality of moving loci, based on the evaluation results by the moving locus evaluation unit, wherein when the actual starting and end points of moving differ, the moving locus creation unit is configured to perform at least one of rotation, scaling down and scaling up for each of the plurality of moving loci, adjusts the starting and end points of each moving locus to the actual starting and end points of moving, and create a plurality of adjusted moving loci;

the moving locus evaluation unit is configured to take building data on the building structure including information of an outline of the building and evaluate each of the adjusted moving loci as to whether it falls within the outline of the building; and the optimal moving locus determination unit is configured to determine an adjusted moving locus of the longest moving distance among moving loci falling within the building outline as an optional one.

2. The information processing apparatus according to claim 1, wherein when the actual starting and end points of moving are the same, the moving locus evaluation unit is configured to take building data on the building structure and calculate for each of the plurality of moving loci a difference in distance between the starting and end points of the locus and an in-building ratio by which the locus falls within the outline of the building; and the optimal moving locus determination unit is configured to determine an optimal moving locus, based on the difference and the in-building ratio.

3. The information processing apparatus according to claim 1, further comprising:
a correction unit that is configured to perform at least one of scaling up, scaling down, rotation, and displacement for an optimal moving locus determined by the optimal moving locus determination unit based on the building data, thereby correcting the moving locus.

4. An information processing apparatus configured to create information representing a locus of an object moving in a building, using data acquired by an acceleration sensor and data acquired by a gyro sensor, the information processing apparatus comprising:
a moving speed analysis unit that is configured to analyze a moving speed using acceleration data acquired by the acceleration sensor and calculate moving distance of the object;
a relative azimuth calculation unit that is configured to remove each of a plurality of given candidate values of draft components from angular velocity data acquired by the gyro sensor and generate a plurality of relative azimuths data pieces;
a moving direction calculation unit that is configured to calculate a plurality of moving directions of the object, based on the respective relative azimuths data pieces generated by the relative azimuth calculation unit:
a moving locus creation unit that is configured to create a plurality of moving loci corresponding to the plurality of candidate values of draft components, using information on the moving distance calculated by the moving speed analysis unit and information on the moving directions calculated by the moving direction calculation unit;
a moving locus evaluation unit that is configured to evaluate the plurality of moving loci by comparing the positions of actual starting and end points of moving in the building with the positions of starting and end points of each of the moving loci;
an optimal moving locus determination unit that is configured to determine an optimal moving locus out of the plurality of moving loci, based on the evaluation results by the moving locus evaluation unit; and
a floor data separation unit that is configured to separate each of the acceleration data and the angular velocity data into per-floor data, based on a pattern change in the acceleration data,
wherein the moving speed analysis unit, the relative azimuth calculation unit, the moving direction calculation unit, the moving locus creation unit, the moving locus evaluation unit, and the optimal moving locus determination unit are configured to perform processing on the per-floor data and create information representing the optimal locus per floor.

5. The information processing apparatus according to claim 4,
wherein the floor data separation unit is configured to separate data into per-floor data, additionally using atmospheric pressure data acquired by an atmospheric pressure sensor.

6. The information processing apparatus according to claim 4,
wherein the floor data separation unit is configured to separate data into per-floor data, additionally using GPS data.

7. The information processing apparatus according to claim 4, wherein the floor data separation unit is configured to separate data into per-floor data, additionally using RFID data.

8. An information processing apparatus comprising:
a moving locus inference unit that is configured to infer a moving locus of an object moving in a building;
a storage that is configured to hold the moving locus and radio field strength data acquired by measuring radio field strength at a plurality of points in the building when the object moves:
a data integration unit that is configured to associate and integrate the locus information and the radio field strength data; and
an output unit that is configured to output integrated data generated by the data integration unit,
wherein the moving locus inference unit is configured to
(i) analyze a moving speed using acceleration data acquired by an acceleration sensor and calculates a moving distance of the object;
(ii) remove each of a plurality of given candidate values of drift components from angular velocity data acquired by a gyro sensor and generate a plurality of relative azimuths data pieces:
(iii) calculate a plurality of moving directions of the object, based on the respective relative azimuths data pieces;
(iv) create a plurality of moving loci corresponding to the plurality of candidate values of drift components, using information on the moving distance and information on the moving directions;
(v) evaluate the plurality of moving loci by comparing the positions of actual starting and end points of moving in the building with the positions of starting and end points of each of the moving loci; and
(vi) determine an optimal moving locus out of the plurality of moving loci, based on the result of evaluating the plurality of moving loci,
wherein the moving locus information and the radio field strength data each include information on time points; and
the data integration unit is configured to associate the moving locus with the radio field strength data, based on the information on time points,
wherein when a time interval of acquisition of the radio field strength is longer than a time interval of creation of the locus information, the data integration unit is configured to associate the locus information with the radio field strength data by interpolating the radio field strength data.

* * * * *